US008117476B2

(12) United States Patent
Yamaji

(10) Patent No.: US 8,117,476 B2
(45) Date of Patent: Feb. 14, 2012

(54) INFORMATION PROCESSING APPARATUS, STARTUP METHOD AND COMPUTER PROGRAM

(75) Inventor: Hidenori Yamaji, Tokyo (JP)

(73) Assignee: Sony Corporation (JP)

( * ) Notice: Subject to any disclaimer, the term of this patent is extended or adjusted under 35 U.S.C. 154(b) by 1082 days.

(21) Appl. No.: 12/005,638

(22) Filed: Dec. 27, 2007

(65) Prior Publication Data

US 2008/0180564 A1    Jul. 31, 2008

(30) Foreign Application Priority Data

Dec. 28, 2006   (JP) ................................ P2006-355323

(51) Int. Cl.
*G06F 1/30* (2006.01)
*G06F 1/32* (2006.01)
(52) U.S. Cl. ..................... 713/323; 713/320; 713/340
(58) Field of Classification Search ........... 713/300–340
See application file for complete search history.

(56) References Cited

U.S. PATENT DOCUMENTS

| 6,457,136 B1 | 9/2002 | Sugiura |
| 6,901,298 B1 * | 5/2005 | Govindaraj et al. ............ 700/21 |
| 2006/0068855 A1 * | 3/2006 | Miyazaki et al. ............. 455/574 |

FOREIGN PATENT DOCUMENTS

| JP | 10-207588 A | 6/1998 |
| JP | 11-194846 A | 7/1999 |
| JP | 2004-362426 A | 12/2004 |

* cited by examiner

*Primary Examiner* — Dennis M Butler
(74) *Attorney, Agent, or Firm* — Lerner, David, Littenberg, Krumholz & Mentlik, LLP

(57) ABSTRACT

An information processing apparatus pausing in one of pause states may include a suspension state and a hibernation state, includes a storage control unit for controlling storage of pause state information regarding one of the suspension state and the hibernation state in the case of transition thereto, a detecting unit for detecting a stop of supplying power, the power being supplied to maintain the suspension state as the pause state, and a startup method determination unit for determining a startup method to transition from the pause state to an operating state based on the pause state information and history information indicating a history of supplying power in the pause state accounting for the detection results about the stop of supplying power.

12 Claims, 26 Drawing Sheets

FIG. 7

| | HOST CPU | SDRAM | EMBEDDED CONTROLLER (RTC) |
|---|---|---|---|
| OPERATING STATE S0 | ON | ON | ON |
| SUSPENSION STATE S3 | OFF | ON | ON |
| HIBERNATION STATE S4 SOFT-OFF STATE S5 | OFF | OFF | ON |
| MECHANICAL-OFF STATE G3 | OFF | OFF | OFF (RTC IN OPERATION) |

INFORMATION PROCESSING APPARATUS, STARTUP METHOD AND COMPUTER PROGRAM

CROSS-REFERENCE TO RELATED APPLICATIONS

This application claims priority from Japanese Patent Application No. JP 2006-355323 filed in the Japanese Patent Office on Dec. 28, 2006, the entire content of which is incorporated herein by reference.

BACKGROUND OF THE INVENTION

1. Field of the Invention

The present invention relates to an information processing apparatus, a startup method and a computer program and, in particular, to an information processing apparatus, a startup method and a computer program for performing quick startup.

2. Description of the Related Art

Digital still cameras are now in widespread use. The digital still camera employs a high technical standard of graphic user interface (GUI) and is typically connected to networks. To meet even higher functional demands from users, digital still cameras can execute a high-performance and multi-functional operating system such as Linux (Registered Trademark).

High-performance and multi-functional operating systems, such as Linux, generally need more time to start in comparison with a small-scale operating system such as micro industrial real-time operating system nucleus (CITRON).

If a process in applications, such as GUI or connection with a network, becomes sophisticated, the application program becomes large in scale and takes more time to start.

The operating system and the application program stored not on a NOR-type flash memory directly executing a program stored thereon but on a NAND-type flash memory make the startup operation even slower. If the program is stored on a NAND-type flash memory, the program needs to be loaded onto a random-access memory (RAM) first before execution.

Japanese Unexamined Patent Application Publication No. 2004-362426 discloses a technique that permits a suspension process and a resume process to be efficiently performed. In accordance with the disclosure, a non-volatile memory is arranged as a main memory device, power is shut down after information required to continue process is re-stored onto the non-volatile memory, a process interrupted by the power shut down resumes using the information stored on the non-volatile memory when power is restored, the information required to resume the process is identified and prioritized, information is stored onto the non-volatile memory on a higher priority first basis, and information having a lower priority not stored is re-stored onto a secondary memory.

SUMMARY OF THE INVENTION

An apparatus operating from a removable internal battery takes a long time at a next startup once the battery is removed in the suspension state. The apparatus sometimes cannot be normally started up.

It may thus be desirable to start the apparatus quickly even if the power supplying to maintain the suspension state is stopped as a result of a removal of the battery, for example.

In accordance with one embodiment of the present invention, an information processing apparatus pausing in one of pause states including a suspension state and a hibernation state, may include a storage control unit for controlling storage of pause state information regarding one of the suspension state and the hibernation state in the case of transition thereto, a detecting unit for detecting a stop of supplying power, the power being supplied to maintain the suspension state as the pause state, and a startup method determination unit for determining a startup method to transition from the pause state to an operating state based on the pause state information and history information indicating a history of supplying power in the pause state accounting for the detection results about the stop of supplying power.

The startup method determination unit may determine the startup method to transition from the pause state to the operating state between a first startup method and a second startup method. The first startup method may be initiated by executing a program stored on a volatile memory in the suspension state, the program once stored on the volatile memory in the operating state immediately prior to transitioning to the pause state. The second startup method may be initiated by loading an image stored on a non-volatile memory to the volatile memory for execution, the image corresponding to the program once stored on the volatile memory in the operating state immediately prior to transitioning to the pause state.

Preferably, the startup method determination unit determines the first startup method as the startup method to transition from the pause state to the operating state if the pause state information indicates the suspension state and if the history information indicates the power supplying has not been stopped in the suspension state.

Preferably, the startup method determination unit determines the second startup method as the startup method to transition from the pause state to the operating state if the pause state information indicates the suspension state and if the history information indicates the power supplying has been stopped in the suspension state.

Preferably, the startup method determination unit determines the second startup method as the startup method to transition from the pause state to the operating state if the pause state information indicates the hibernation state.

The information processing apparatus may include a pause state determination unit for determining whether to transition to the suspension state or the hibernation state.

If a battery supplying power to maintain the suspension state is once unloaded and then reloaded, the operating state may be activated in response to the loading of the battery and then unconditionally transitioned to the suspension state.

The detecting unit may detect the stop of supplying power in response to the unloading of the battery supplying power for maintaining the suspension state.

The detecting unit may detect the stop of supplying power fed from an external power supply for maintaining the suspension state.

In accordance with one embodiment of the present invention, an information processing method of an information processing apparatus pausing in one of pause states including a suspension state and a hibernation state, may include steps of controlling storage of pause state information regarding one of the suspension state and the hibernation state in the case of transition thereto, detecting a stop of supplying power, the power being supplied to maintain the suspension state as the pause state, and determining a startup method to transition from the pause state to an operating state based on the pause state information and history information indicating a history of supplying power in the pause state accounting for the detection results about the stop of supplying power.

In accordance with one embodiment of the present invention, a computer program for causing a computer to perform an information processing method of an information processing apparatus pausing in one of pause states including a suspension state and a hibernation state, may include acquiring pause state information and history information, the pause state information indicating one of the suspension state and the hibernation state and stored in the case of transition thereto, and the history information indicating a history of a stop of supplying power in the pause state accounting for a detection of the stop of supplying power for maintaining the suspension state, and determining a startup method to transition from the pause state to an operating state based on the pause state information and the history information.

In accordance with embodiments of the present invention, the pause state information regarding one of the suspension state and the hibernation state may be stored in the case of transition thereto, the stop of supplying power to maintain the suspension state as the pause state is detected, and the startup method to transition from the pause state to the operating state is determined based on the pause state information and the history information indicating the history of supplying power in the pause state accounting for the detection results about the stop of supplying power.

In accordance with embodiments of the present invention, the pause state information and the history information may be acquired. The pause state information may indicate one of the suspension state and the hibernation state and stored in the case of transition thereto, and the history information may indicate the history of the stop of supplying power in the pause state accounting for the detection of the stop of supplying power to maintain the suspension state. The startup method to transition from the pause state to the operating state may be determined based on the pause state information and the history information.

In accordance with embodiments of the present invention, the information processing apparatus may resume operation from one of the suspension state and the hibernation state.

In accordance with embodiments of the present invention, the information processing apparatus may be quickly started up even if power supplied to maintain the suspension state is stopped.

BRIEF DESCRIPTION OF THE DRAWINGS

FIG. 7 illustrates states of the digital still camera;

DETAILED DESCRIPTION

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 5:
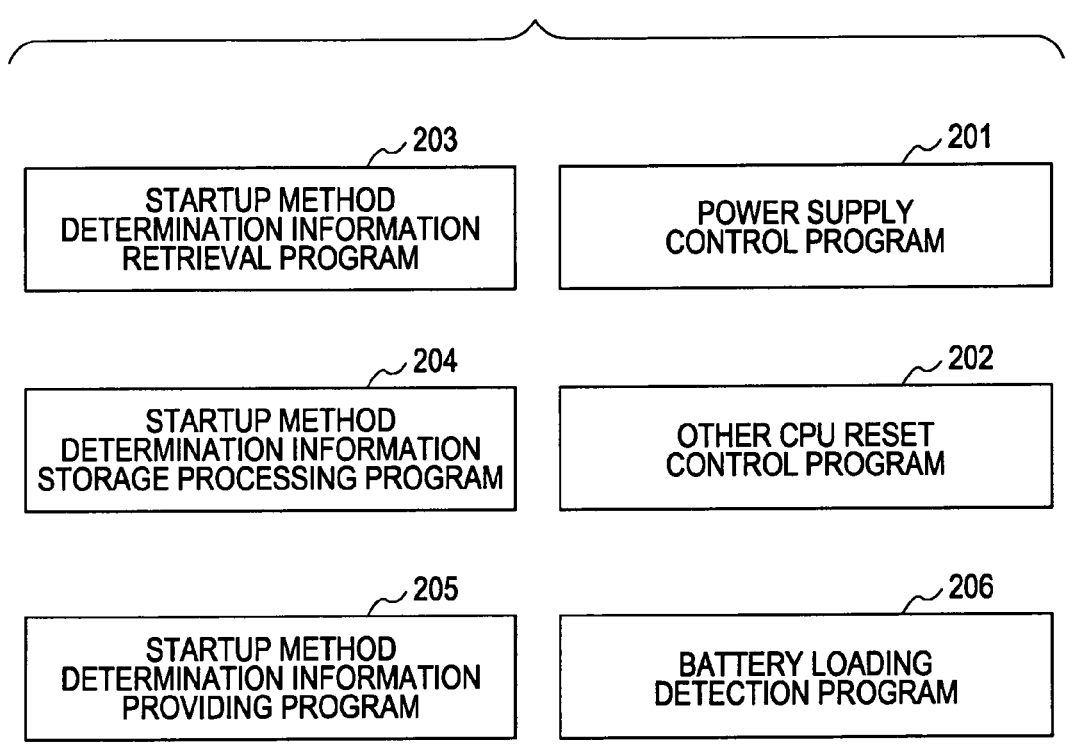
FIG. 5 is a block diagram illustrating a process executed by an embedded controller.

In accordance with one embodiment of the present invention, an information processing apparatus (for example, digital still camera of FIG. 1) pausing in one of pause states including a suspension state and a hibernation state, includes a storage control unit (for example, startup method determination information storage processing program 204 of FIG. 5) for controlling storage of pause state information regarding one of the suspension state and the hibernation state in the case of transition thereto, a detecting unit (for example, battery loading detection program 206 of FIG. 5) for detecting a stop of supplying power, the power being supplied to maintain the suspension state as the pause state, and a startup method determination unit (for example, startup method determination program 122 of FIG. 3) for determining a startup method to transition from the pause state to an operating state based on the pause state information and history information indicating a history of supplying power in the pause state accounting for the detection results about the stop of supplying power.

The startup method determination unit may determine the startup method to transition from the pause state to the operating state between a first startup method (for example, hot boot) and a second startup method (for example, warm boot). The first startup method is initiated by executing a program stored on a volatile memory in the suspension state, the program once stored on the volatile memory in the operating state immediately prior to transitioning to the pause state. The second startup method is initiated by loading an image stored on a non-volatile memory to the volatile memory for execution, the image corresponding to the program once stored on the volatile memory in the operating state immediately prior to transitioning to the pause state.

The information processing apparatus may include pause state determination unit (for example, pause state determination program 74 of FIG. 2) for determining whether to transition to the suspension state or the hibernation state.

If a battery (for example, battery 35 of FIG. 1) supplying power to maintain the suspension state is once unloaded and then reloaded, the operating state may be activated in response to the loading of the battery and then unconditionally transitioned to the suspension state.

The detecting unit may detect the stop of supplying power responsive to the unloading of the battery (for example, battery 35 of FIG. 1) supplying power to maintain the suspension state.

The detecting unit may detect the stop of supplying power fed from an external power supply (for example, external power supply of FIG. 1) for maintaining the suspension state.

Figure 17:
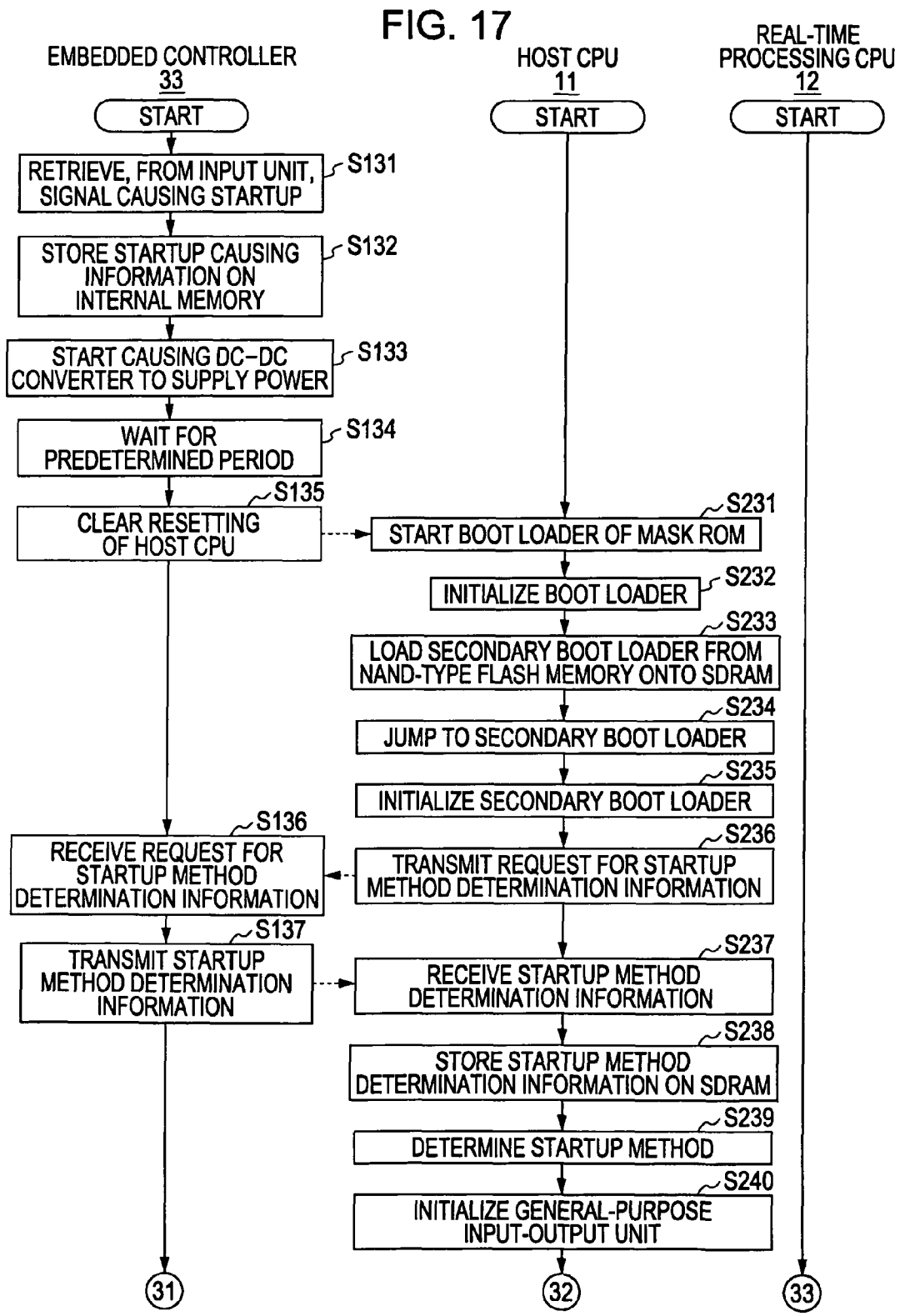
FIG. 17 is a flowchart illustrating in detail the startup process of the hot boot.

In accordance with one embodiment of the present invention, an information processing method of an information processing apparatus pausing in one of pause states including a suspension state and a hibernation state, includes steps of controlling storage of pause state information regarding one of the suspension state and the hibernation state in the case of transition thereto (for example, in step S602 of FIG. 23), detecting a stop of supplying power, the power being supplied to maintain the suspension state as the pause state (for example, in step S901 of FIG. 24), and determining a startup method to transition from the pause state to an operating state based on the pause state information and history information indicating a history of supplying power in the pause state accounting for the detection results about the stop of supplying power (for example, in step S239 of FIG. 17).

In accordance with one embodiment of the present invention, a computer program for causing a computer to perform an information processing method of an information processing apparatus pausing in one of pause states including a suspension state and a hibernation state, includes steps of acquiring pause state information and history information, the pause state information indicating one of the suspension state and the hibernation state and stored in the case of transition thereto, and the history information indicating a history of a stop of supplying power in the pause state accounting for a detection of the stop of supplying power for maintaining the suspension state (for example, in step S237 of FIG. 17), and determining a startup method to transition from the pause state to an operating state based on the pause state information and the history information (for example, in step S239 of FIG. 17).

Figure 1:
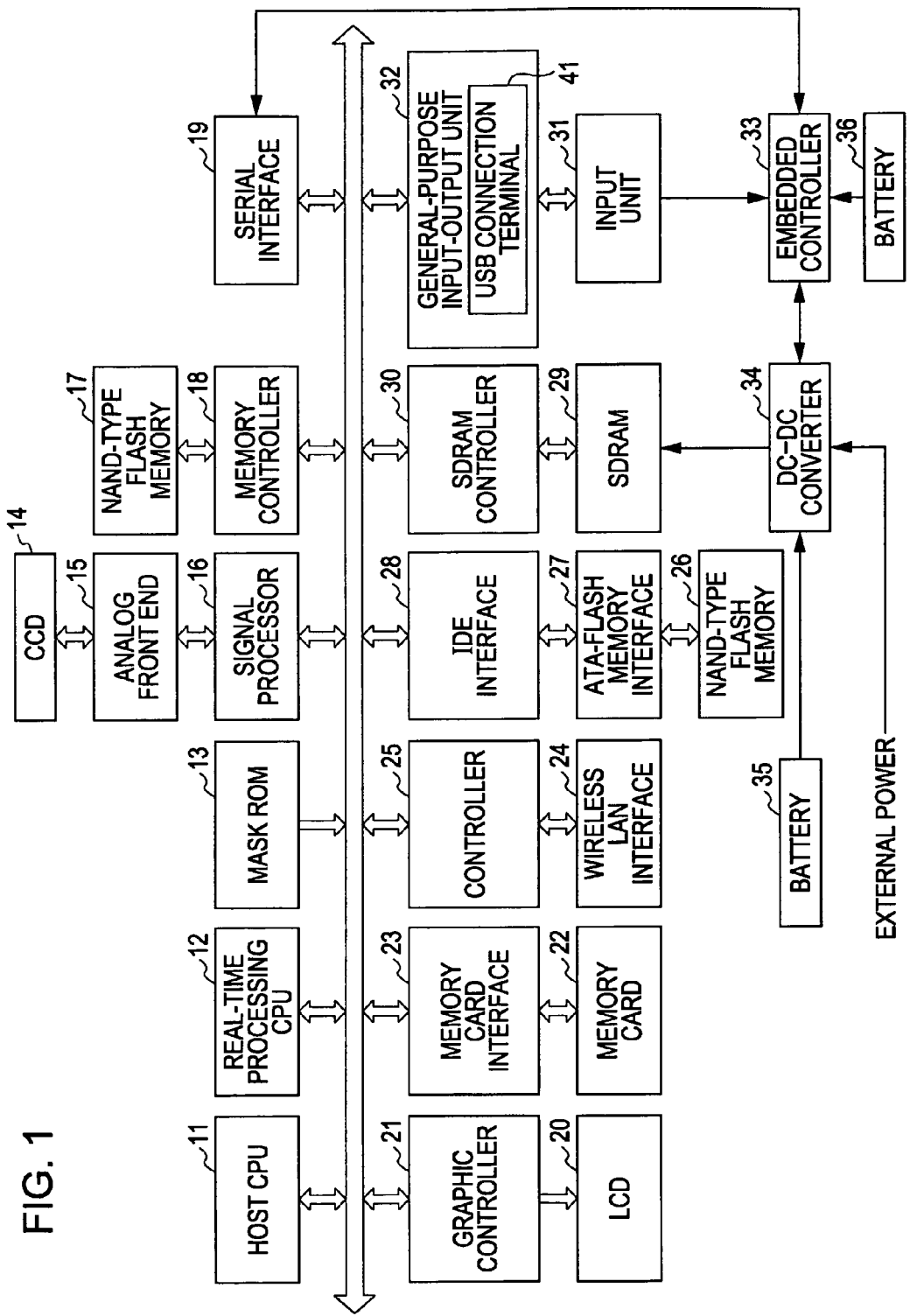
FIG. 1 is a block diagram of a digital still camera as one example of information processing apparatus in accordance with one embodiment of the present invention.

FIG. 1 is a block diagram illustrating a digital still camera in accordance with one embodiment of the present invention. The digital still camera includes a host CPU 11, a real-time processing CPU 12, a mask read-only memory (ROM) 13, a charge-coupled device (CCD) 14, an analog front end 15, a signal processor 16, a NAND-type flash memory 17, a memory controller 18, a serial interface 19, a liquid-crystal display (LCD) 20, a graphic controller 21, a memory card 22, a memory card interface 23, a wireless local area network (LAN) interface 24, a controller 25, a NAND-type flash memory 26, an AT attachment (ATA) flash memory interface 27, an integrated device electronics (IDE) interface 28, a synchronous dynamic random access memory (SDRAM) 29, a SDRAM controller 30, an input unit 31, a general-purpose input-output unit 32, an embedded controller 33, a direct-current (DC)—direct-current (DC) converter 34, a battery 35 and a battery 36.

A bus interconnects the host CPU 11, the real-time processing CPU 12, the mask ROM 13, the signal processor 16, the memory controller 18, the serial interface 19, the graphic controller 21, the memory card interface 23, the controller 25, the IDE interface 28, the SDRAM controller 30 and the general-purpose input-output unit 32.

The host CPU 11, including one of an embedded CPU and a general-purpose CPU, executes an operating system and an application program. The host CPU 11 thus performs a GUI process on the digital still camera, thereby setting a size of an image size, a data compression rate of the image, and exposure and shutter speed on the digital still camera.

The real-time processing CPU 12, including one of an embedded CPU and a general-purpose CPU, executes an operating system and an application program independently of the host CPU 11. The real-time processing CPU 12 thus performs a real-time process, controlling each block of the digital still camera.

The mask ROM 13 stores data unique to the digital still camera and a boot loader to be executed by the host CPU 11 at startup.

The startup refers to not only a startup operation from a power interrupted state but also a startup operation from a suspension state, a hibernation state, or a soft-off state, i.e., a resume operation. The mask ROM 13 may store a secondary boot loader together with the boot loader.

The CCD 14 is an image sensor and connected to the analog front end 15. The CCD 14 outputs to the analog front end 15 an analog signal responsive to an image of a subject focused on a photo-sensitive unit by an optical system (not shown). A complementary metal-oxide semiconductor (CMOS) sensor may be substituted for the CCD 14.

The analog front end 15 is connected to each of the CCD 14 and the signal processor 16. The analog front end 15 performs predetermined processes such as a noise elimination process on the analog signal responsive to the image of the subject from the CCD 14, thereby converting the analog signal into a digital signal. The analog front end 15 then supplies the obtained digital signal of the image of the subject to the signal processor 16.

The signal processor 16 performs predetermined processes such as a white balance process and an encoding process on the digital signal of the image of the subject supplied from the analog front end 15. The signal processor 16 supplies the data of the image of the subject obtained as a result of a predetermined process to the NAND-type flash memory-26 via the bus, the IDE interface 28 and the ATA flash memory interface 27 or to the memory card 22 via the bus and the memory card interface 23.

The NAND-type flash memory 17, as one example of non-volatile memories, is connected to the memory controller 18. The NAND-type flash memory 17 stores a program to be executed by the host CPU 11 and data required for the host CPU 11 to perform the program. The NAND-type flash memory 17 also stores a program to be executed by the real-time processing CPU 12 and data required for the real-time processing CPU 12 to perform the program.

The NAND-type flash memory 17 stores an image at the moment the digital still camera is transitioned from the hibernation state to an operating state. The image recorded on the NAND-type flash memory 17 is data containing a program loaded on the SDRAM 29 and data with the digital still camera in operation. By loading the image from the NAND-type flash memory 17 to the SDRAM 29, the SDRAM 29 stores the program and data with the digital still camera in operation.

The image stored on the NAND-type flash memory 17 contains the program to be executed by the host CPU 11 and the data. Alternatively, the image stored on the NAND-type flash memory 17 may contain the program to be executed by the host CPU 11 and the related data and a program to be executed by the real-time processing CPU 12 and related data.

The image stored on the NAND-type flash memory 17 may also be referred to as a warm boot image.

The memory controller 18 controls a read operation to read the program and the data or the warm boot image from the NAND-type flash memory 17. The memory controller 18 controls a write operation to write a variety of data such as a warm boot image onto the NAND-type flash memory 17.

The serial interface 19 performs serial communications between the host CPU 11 and the embedded controller 33.

The LCD 20 displays a variety of images and text under the control of the connected graphic controller 21. The graphic controller 21 controls a displaying operation of the graphic controller 21.

The memory card 22 includes a non-volatile memory medium, such as a Memory Stick®, and is detachably mounted onto the digital still camera. When loaded onto the digital still camera, the memory card 22 is electrically connected to the memory card interface 23. The memory card interface 23 controls storage of data onto the loaded memory card 22 and reading of data from the loaded memory card 22.

The wireless LAN interface 24, in compliance with the Institute of Electrical and Electronic Engineers (IEEE) Standards 802.11a, 11b or 11g, communicates with an access point or another device. The controller 25, connected to the wireless LAN interface 24 and the bus, controls the wireless LAN interface 24.

The NAND-type flash memory 26 is a non-volatile storage medium and under the control of the ATA flash memory interface 27 stores a variety of data such as data of the image. The ATA flash memory interface 27 serves as an interface between the IDE interface 28 and the NAND-type flash memory 26 and communicates with the IDE interface 28 in accordance with the ATA standard. The IDE interface 28 communicates with the ATA flash memory interface 27. Since the NAND-type flash memory 26 is connected to the bus via the ATA flash memory interface 27 and the IDE interface 28, the host CPU 11 can control the NAND-type flash memory 26 using a command complying with the IDE standard intended for one of a hard disk and an optical disk drive.

The SDRAM 29, as one example of recording media, is connected to the SDRAM controller 30. The SDRAM 29 stores the operating system and application program to be executed by the host CPU 11 and the operating system and application program to be executed by the real-time processing CPU 12. The host CPU 11 executes the operating system and the application program stored on the SDRAM 29. The real-time processing CPU 12 executes the operating system and the application program stored on the SDRAM 29.

The SDRAM 29 has a self-refresh function to refresh data (containing the program) stored thereon with power supplied thereto.

The SDRAM controller 30 controls a write operation to write the program and the data onto the SDRAM 29 and a read operation to read the program and the data from the SDRAM 29.

The input unit 31 includes a power button, a wireless LAN button, a universal serial bus (USB) button, a switch for opening and closing a lens cap (lens shutter), cross keys, a touchpanel, etc. The input unit 31 supplies to the general-purpose input-output unit 32 and the embedded controller 33 a signal responsive to pressing operations of the power button, the wireless LAN button and the USB button, a signal responsive to opening and closing operations of the lens cap, and a signal responsive to operations of the cross keys and the touchpanel.

The general-purpose input-output unit 32 serves as a serial or parallel general-purpose input-output interface. The general-purpose input-output unit 32 supplies to one of the host CPU 11 and the real-time processing CPU 12 via the bus data of the signal responsive to the operations of the power button, the wireless LAN button and the USB button, the signal responsive to the opening and closing operations of the lens cap, and the signal responsive to the operations of the cross keys and the touchpanel.

The general-purpose input-output unit 32 includes a USB connection terminal 41 for connection with one of a USB device and a USB cable.

If one end of a cable (not shown) is connected to a device such as a personal computer with the other end connected to the USB connection terminal 41, the general-purpose input-output unit 32 supplies the embedded controller 33 with a signal indicating that the USB connection terminal 41 is connected the device.

The embedded controller 33 as an embedded CPU executes the program stored on the internal ROM or the internal RAM. The embedded controller 33 includes a real-time clock for time counting. In response to a signal supplied from the input unit 31, the embedded controller 33 controls resetting of the host CPU 11 and clearing the reset state on the host CPU 11 in response to the signal supplied from the input unit 31 when one of the power button, the wireless LAN button and the USB button is pressed, or when the lens cap is opened or closed.

The embedded controller 33 controls supplying of power from the DC-DC converter 34 to each block of the digital still camera.

The DC-DC converter 34 converts power supplied from the battery 35 as a DC voltage power supply or an external power supply and supplies or stops supplying power at a predetermined voltage to each block in the digital still camera under the control of the embedded controller 33.

The battery 35 is a secondary battery detachably mounted on the digital still camera. The battery 35 supplies power to the digital still camera via the DC-DC converter 34.

The battery 36 is a primary battery such as a button battery. When power is not supplied from the external power supply or the battery 35, the battery 36 supplies power to the embedded controller 33.

The program to be executed by the host CPU 11, the program to be executed by the real-time processing CPU 12 and the program to be executed by the embedded controller 33 are described below.

In the discussion that follows, it is sometimes described that a particular process is executed by a particular program, but such a language is intended to describe that a particular process is executed by a corresponding computer.

Figure 2:
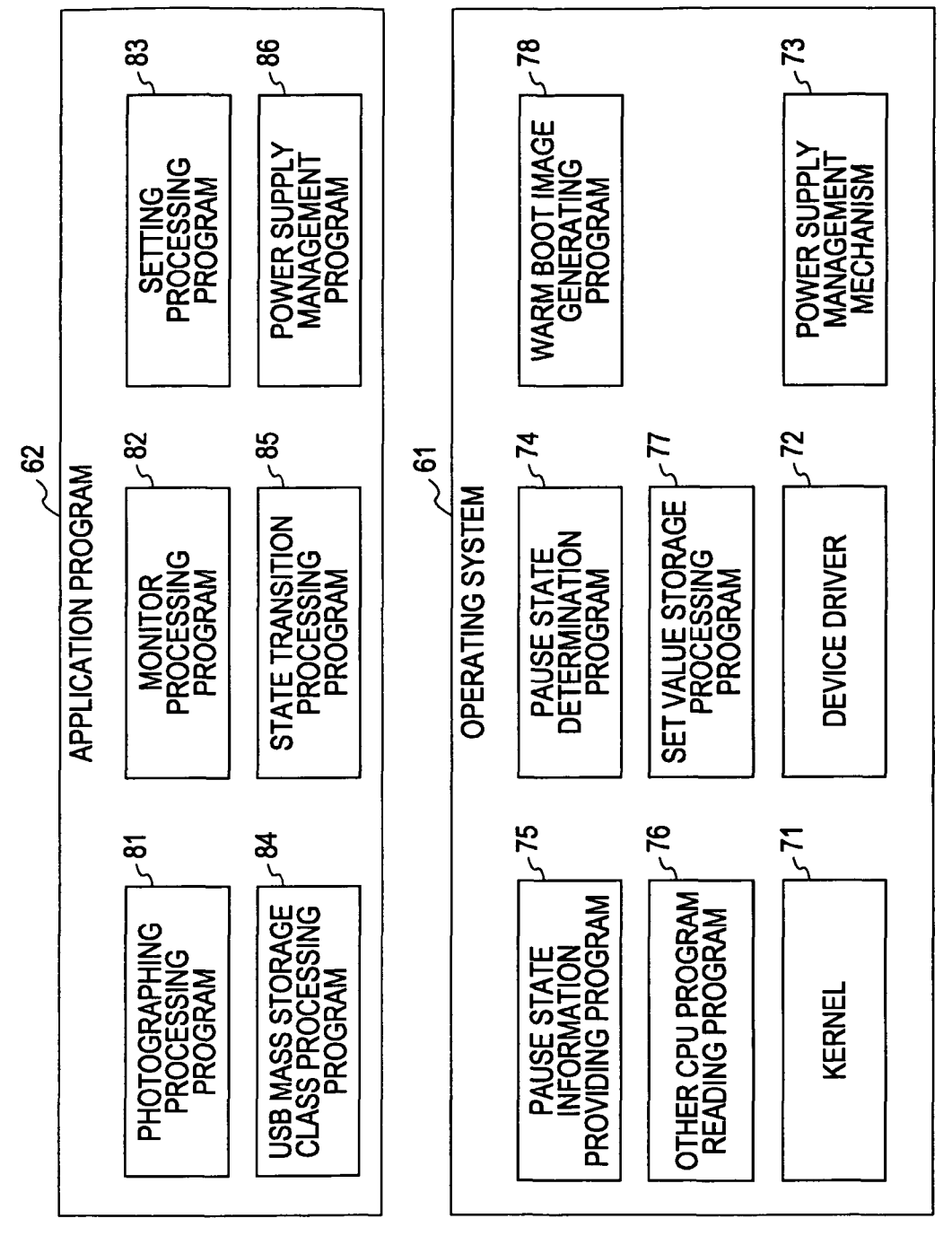
FIG. 2 is a block diagram illustrating an operating system and an application program executed by a host CPU.

With reference to FIG. 2, an operating system 61 and an application program 62 to be executed by the host CPU 11 are described below.

The host CPU 11 executes the operating system 61 and the application program 62.

The operating system 61 is a Linux (Registered Trademark) operating system, for example and performs a basic process such as software management. The application program 62 displays an image of a subject to be photographed and monitors the photographed image.

The operating system 61 includes a kernel 71, a device driver 72, a power supply management mechanism 73, a pause state determination program 74, a pause state information providing program 75, an other CPU program reading program 76, a set value storage processing program 77 and a warm boot image generating program 78.

The kernel 71, serving as a core of the operating system 61, monitors the application program 62 and devices such as the mask ROM 13 through the general-purpose input-output unit 32, manages resources such as the SDRAM 29, the memory card 22 and the NAND-type flash memory 26, and performs interrupt processes and inter-process communications.

The device driver 72 controls devices including the signal processor 16, the serial interface 19, the graphic controller 21, the memory card interface 23, the controller 25, the IDE interface 28 and the general-purpose input-output unit 32. The device driver 72 individually controls the signal processor 16 through the general-purpose input-output unit 32. In the following discussion, however, the device driver 72 is described as a driver that generally controls the signal processor 16 through the general-purpose input-output unit 32 without discriminating one element from another.

The power supply management mechanism 73, as an advanced configuration and power interface (ACPI) sub system, manages power to cause the digital still camera to pause in one of a suspension state, a hibernation state and a soft-off state or to cause the digital still camera to transition from the pause state of the suspension state, the hibernation state and the soft-off state to an operating state.

When the digital still camera is set to pause, the pause state determination program 74 determines whether the digital still camera is in one of the suspension state and the hibernation state.

When the digital still camera is set to pause, the pause state information providing program 75 supplies to the embedded controller 33 via the serial interface 19 pause state information indicating whether the digital still camera is in either the suspension state or the hibernation state.

When the digital still camera is set to pause, the other CPU program reading program 76 loads the operating system and the application program stored on the NAND-type flash memory 17 onto the SDRAM 29.

An action of reading the program or data from the NAND-type flash memory 17 and storing the read program or data onto the SDRAM 29 is referred to as "loading the program or data from the NAND-type flash memory 17 to the SDRAM 29."

When the digital still camera is set to pause, the set value storage processing program 77 stores onto the NAND-type flash memory 17 data required to start up the digital still camera subsequent to the pause period. The required data may contain the shutter speed, exposure, the size of the image zoomed or photographed, the compression rate in the encoding process, and set values such as register values in the host CPU 11.

When a firmware, such as one of the operating system 61 and the application program 62, is updated and the digital still camera starts from a power-off state, the warm boot image generating program 78 generates a warm boot image immediately subsequent to startup. The warm boot image generating program 78 causes the NAND-type flash memory 17 to store the generated warm boot image.

The application program 62 includes a photographing processing program 81, a monitor processing program 82, a setting processing program 83, a USB mass storage class processing program 84, a state transition processing program 85 and a power supply management program 86.

The photographing processing program 81 controls displaying of an image of a subject to be photographed onto the LCD 20, image processing of a photographed image, and encoding and storage of data of the photographed image. The photographing processing program 81 thus performs a photographing process.

The monitor processing program 82 allows a user to view an image by displaying on the LCD 20 data of an image photographed and stored on one of the NAND-type flash memory 26 and the memory card 22.

The setting processing program 83 performs a variety of setting processes for shutter speed, exposure, a size of an image to be zoomed or photographed, an encoding method, a compression rate in an encoding process, a storage destination of image data and a manner of displaying an image in a viewing operation.

When a cable is used with one end connected to a device such as a personal computer and with the other end connected to the USB connection terminal 41, the USB mass storage class processing program 84 performs a USB mass storage class process to cause the digital still camera to operate as a recording device.

Each of the photographing processing program 81 through the USB mass storage class processing program 84 performs a GUI process required for each of the photographing process through the USB mass storage class process.

The state transition processing program 85 performs a state transition process to transition the digital still camera to one of the plurality of operating states. The operating state will be described later.

The power supply management program 86 serves as an interface for managing power provided by a Linux (Registered Trademark) kernel, and issues a variety of commands relating to states of power supply.

The operating system 61 may include the state transition processing program 85.

Figure 3:
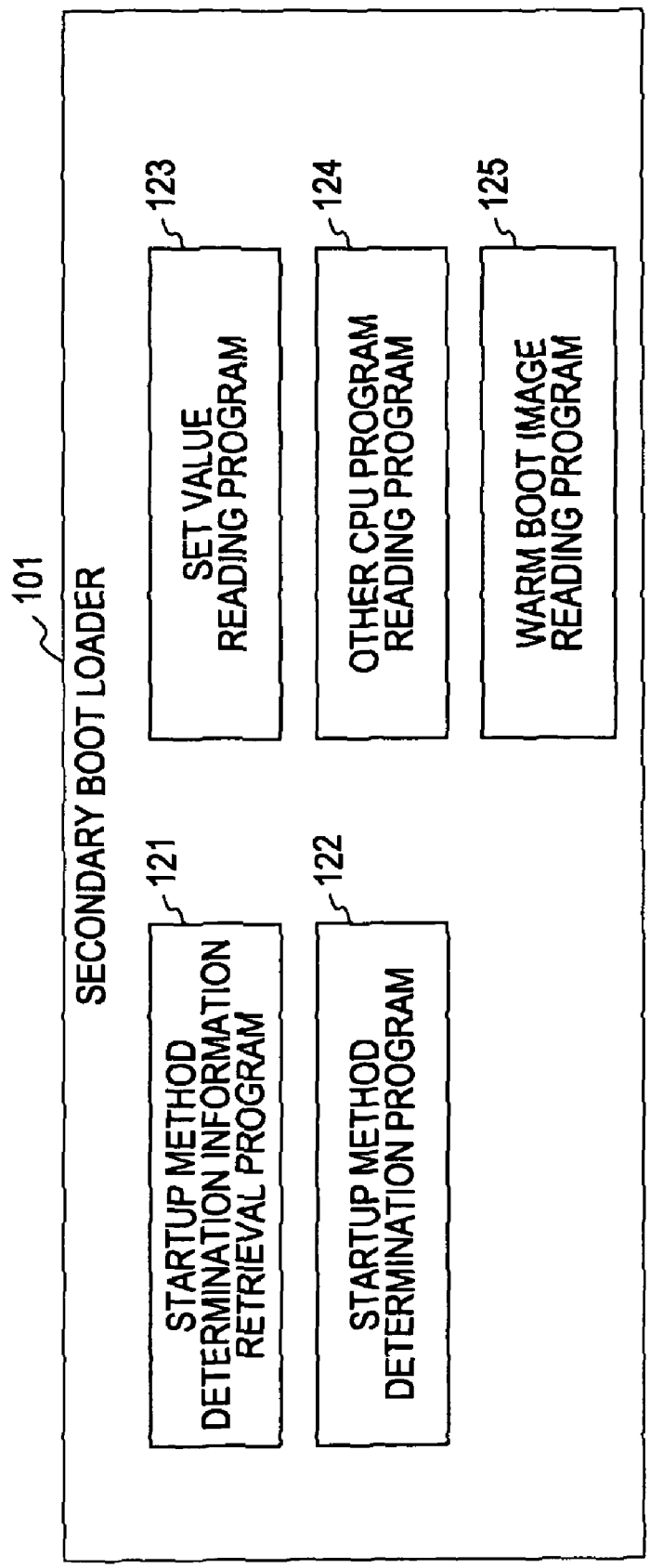
FIG. 3 is a block diagram illustrating a secondary boot loader executed by the host CPU.

A second boot loader 101 to be executed by the host CPU 11 at the startup is described below with reference to FIG. 3. At the startup, the second boot loader is loaded onto the SDRAM 29 by the boot loader executed by the host CPU 11 and is then executed.

The secondary boot loader 101 corresponds a program grub or lilo used in the personal computer and controls the startup of the operating system 61 and the application program 62.

The secondary boot loader 101 includes a startup method determination information retrieval program 121, a startup method determination program 122, a set value reading program 123, an other CPU program reading program 124 and a warm boot image reading program 125.

The startup method determination information retrieval program 121 retrieves startup method determination information stored on an internal memory of the embedded controller 33. The startup method determination information determines the startup method.

The startup methods include a plurality of methods. In one startup method, the digital still camera may be started by executing a program that is stored on the SDRAM 29 in the suspension state and was also stored on the SDRAM 29 in the operating state immediately prior to the pause. In the other startup method, the digital still camera may be started by loading onto the SDRAM 29 the warm boot image, which was stored on the SDRAM 29 in the operating state prior to the pause, from the NAND-type flash memory 17 and executing the warm boot image.

The startup method that is performed by executing the program that is stored on the SDRAM 29 in the suspension state and was also stored on the SDRAM 29 in the operating state immediately prior to the pause is referred to as a hot boot. The startup method that is performed by loading onto the SDRAM 29 the warm boot image, which was stored on the SDRAM 29 in the operating state prior to the pause, from the NAND-type flash memory 17 and executing the warm boot image is referred to as a warm boot.

The startup method that is performed by opening and starting a file of an operating system stored on the NAND-type flash memory 17 is referred to as a cold boot.

Time required to start the digital still camera in the warm boot is longer than time required to start the digital still camera in the hot start, and time required to start the digital still camera in the cold boot is substantially longer time required to start the digital still camera in the warm boot. More specifically, the startup in the hot boot is substantially quicker than the startup in the cold boot, the startup in the warm boot is quicker than the startup in the cold boot, and the startup in the hot boot is quicker than the startup in the warm boot.

The startup in the hot boot and the warm boot is generally referred to as "resume."

The hot boot, the warm boot and the cold boot handle one of the digital still camera, the host CPU 11 and the operating system 61. In other words, the digital still camera may be started in one of the hot boot, the warm boot and the cold boot, the host CPU 11 may be started in one of the hot boot, the warm boot and the cold boot and the operating system 61 may be started in one of the hot boot, the warm boot and the cold boot.

The startup method determination information is described below. The startup method determination information includes pause state information, battery loading information and startup trigger information.

The pause state information indicates a pause state determined. The pause state information contains an image generation flag indicating whether to generate a warm boot image. The image generation flag, if set, indicates that the warm boot image is to be generated and if cleared indicates that the warm boot flag is not to be generated.

The battery loading information indicates history of loading of the battery 35 in the pause state.

The startup trigger information indicates a cause of trigger, for example, the pressing of one of the power button, the wireless LAN button and the USB button on the input unit 31, the connection of a device to the USB connection terminal 41, and the opening of the lens cap.

The startup method determination information retrieval program 121 stores the startup method determination information retrieved from the embedded controller 33 on a predetermined storage area on the SDRAM 29.

The startup method determination program 122 determines the startup method based on the startup method determination information.

When the digital still camera is set to pause, the set value reading program 123 reads a set value that has been stored on the NAND-type flash memory 17 by the set value storage processing program 77.

In the warm boot or the cold boot, the other CPU program reading program 124 loads onto the SDRAM 29 the operating system and the application program of the real-time processing CPU 12 stored on the NAND-type flash memory 17.

In the warm boot, the warm boot image reading program 125 loads onto the SDRAM 29 the warm boot image from the NAND-type flash memory 17.

Figure 4:
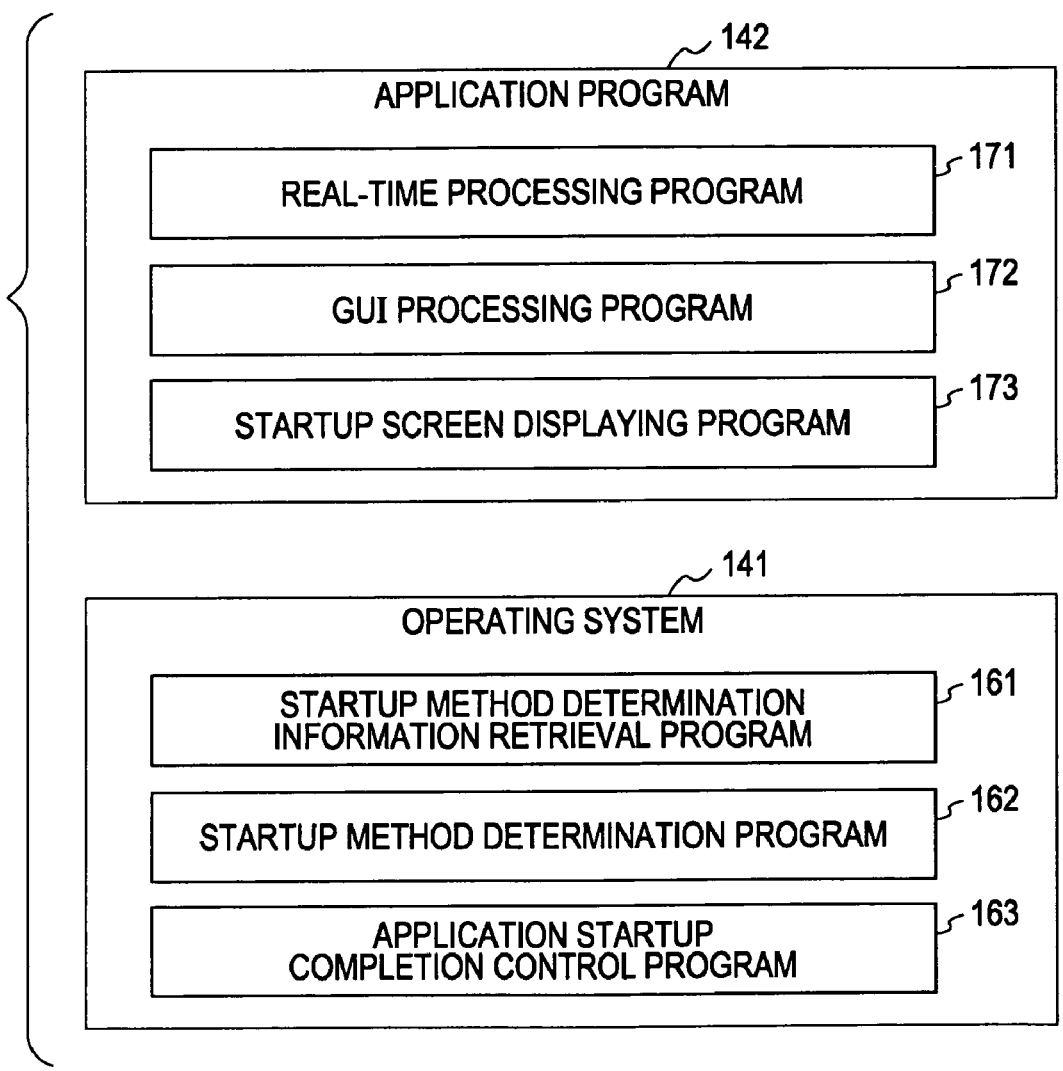
FIG. 4 is a block diagram illustrating an operating system and an application program executed by a real-time processing CPU.

An operating system 141 and an application program 142, both to be executed by the real-time processing CPU 12, are described below with reference to a flowchart of FIG. 4.

The real-time processing CPU 12 executes the operating system 141 and the application program 142.

The operating system 141 is a real-time operating system such as CITRON and performs a variety of basic processes. The application program 142 performs real-time control processes on an optical system (not shown) used to photograph a subject, the CCD 14, the analog front end 15 and the signal processor 16.

The operating system 141 includes a startup method determination information retrieval program 161, a startup method determination program 162 and an application startup completion control program 163.

In the startup operation, the startup method determination information retrieval program 161 retrieves the startup method determination information by reading the startup method determination information that has been stored on the predetermined storage area of the SDRAM 29 by the startup method determination information retrieval program 121.

The startup method determination program 162 determines the startup method based on the startup method determination information, which is the same as the one used by the startup method determination program 122. The startup method determined by the startup method determination program 162 is thus the same as the one determined by the startup method determination program 122.

In the startup operation, the application startup completion control program 163 controls the startup and ending of a variety processes of the application program 142 based on the startup trigger information contained in the startup method determination information.

The application program 142 includes a real-time processing program 171, a GUI processing program 172 and a startup screen displaying program 173.

The real-time processing program 171 controls the optical system (not shown), the CCD 14, the analog front end 15 and the signal processor 16 on a real-time basis.

The GUI processing program 172 performs a user interface process to acquire a command from a user from the input unit 31 that is shared by the real-time processing CPU 12 and the host CPU 11. The GUI processing program 172 performs part of a GUI process performed by the photographing processing program 81 through the USB mass storage class processing program 84, more specifically performs a GUI process, limited to setting of values requested to be set immediately subsequent to the startup, such as setting of a shutter speed, exposure and zoom.

In the startup operation, the startup screen displaying program 173 causes the LCD 20 to display a startup screen showing startup.

The application program 142 may include the application startup completion control program 163.

Programs to be executed by the embedded controller 33 are described below. FIG. 5 illustrates the programs to be executed by the embedded controller 33. The embedded controller 33 includes a power supply control program 201, other CPU reset control program 202, a startup method determination information retrieval program 203, a startup method determination information storage processing program 204, a startup method determination information providing program 205, and a battery loading detection program 206.

The power supply control program 201 controls the DC-DC converter 34, thereby controlling supplying of power to each block of the digital still camera.

The other CPU reset control program 202 controls resetting of the host CPU 11 and clearing a reset state on the host CPU 11.

The startup method determination information retrieval program 203 retrieves the startup method determination information.

When the digital still camera is set to pause, the startup method determination information retrieval program 203 retrieves the pause state information of the startup method determination information by receiving the pause state information transmitted from the pause state information providing program 75.

The startup method determination information retrieval program 203 acquires from the battery loading detection program 206 detection results relating to the loading of the battery 35. The startup method determination information retrieval program 203 generates the battery loading information responsive to the detection results relating to the loading of the battery 35. The startup method determination information retrieval program 203 generates the startup trigger information indicating the pressing of one of the power button, the wireless LAN button and the USB button or the opening of the lens cap in response to the signal supplied from the input unit 31. The signal supplied from the input unit 31 is generated in response to the pressing of one of the power button, the wireless LAN button and the USB button or the opening of the lens cap.

The startup method determination information storage processing program 204 stores the acquired startup method determination information on an internal memory of the embedded controller 33. The startup method determination information storage processing program 204 stores the received pause state information, the generated battery loading information or the generated startup trigger information on the internal memory of the embedded controller 33.

In response to a request from the host CPU 11, the startup method determination information providing program 205 supplies the startup method determination information from the internal memory of the embedded controller 33 to the host CPU 11 via the serial interface 19.

The battery loading detection program 206 detects an output voltage of the DC-DC converter 34, thereby detecting the loading of the battery 35.

Figure 6:
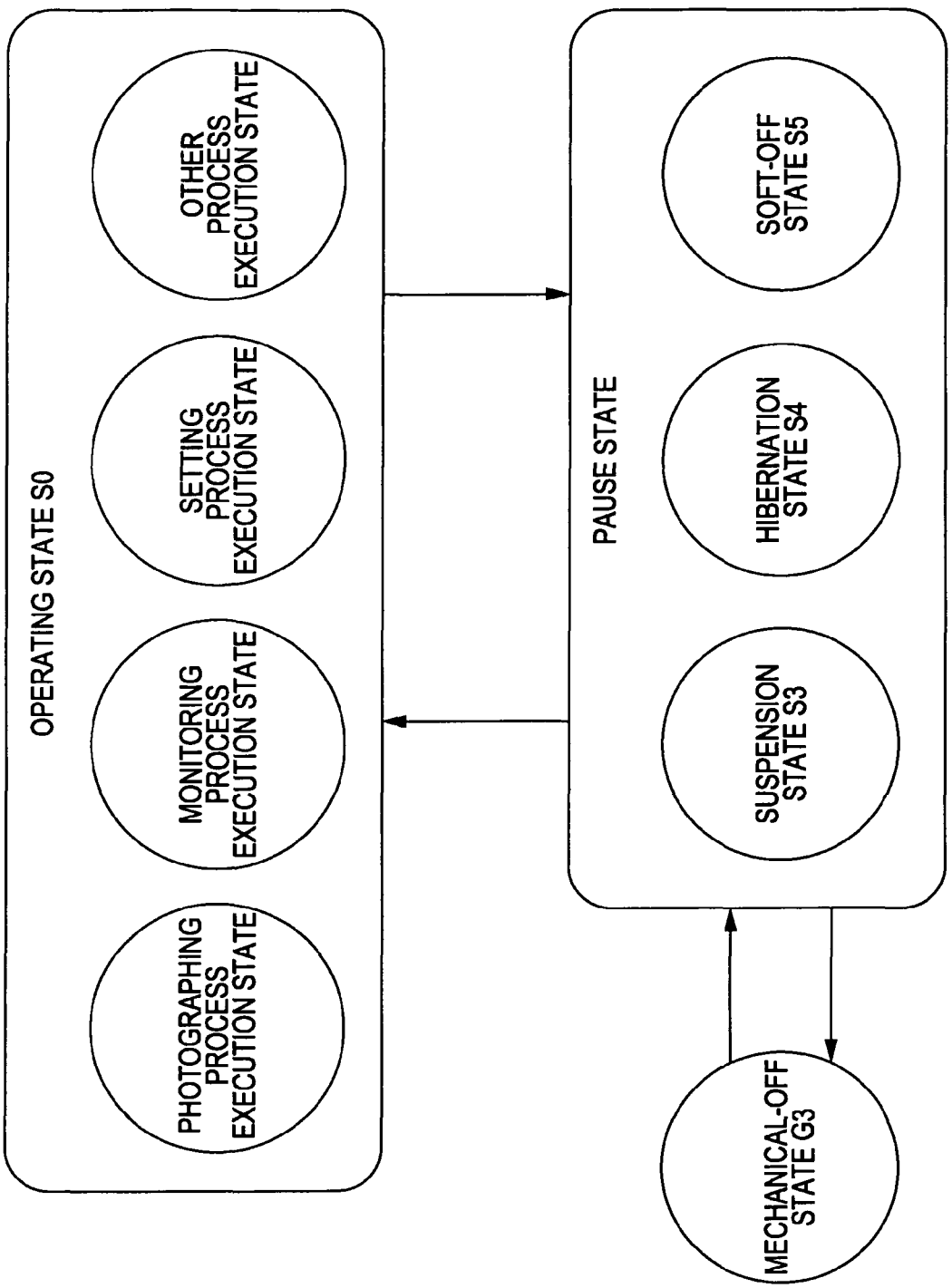
FIG. 6 illustrates states of the digital still camera.

The states of the digital still camera are described below with reference to FIGS. 6 through 9. As shown in FIG. 6, the digital still camera takes one of a mechanical-off state G3, a suspension state S3, a hibernation state S4, a soft-off state S5, a photographing process execution state, a monitoring process execution state, a setting process execution state and other process execution state.

In the photographing process execution state, the host CPU 11 performs the photographing processing program 81. In the monitoring process execution state, the host CPU 11 performs the monitor processing program 82. In the setting process execution state, the host CPU 11 performs the setting processing program 83.

In the other process execution state, the host CPU 11 performs the USB mass storage class processing program 84. Also in the other process execution state, the host CPU 11 performs the application program 62 but performs none of the photographing processing program 81, the monitor processing program 82, the setting processing program 83 and the USB mass storage class processing program 84.

Each of the suspension state S3, the hibernation state S4 and the soft-off state S5 is also referred to as a pause state. Each of the photographing process execution state, the monitoring process execution state, the setting process execution state and the other process execution state is referred to as an operating state S0.

FIG. 7 illustrates whether each of the host CPU 11, the SDRAM 29 and the embedded controller 33 is supplied with power in each of the operating state S0, the suspension state S3, the hibernation state S4, the soft-off state S5 and the mechanical-off state G3.

The label "ON" in FIG. 7 indicates that power is supplied while the label "OFF" in FIG. 7 indicates that no power is supplied.

In the operating state S0, the DC-DC converter 34 powers all of the host CPU 11, the SDRAM 29 and the embedded controller 33.

In the suspension state S3, the DC-DC converter 34 powers the SDRAM 29 and the embedded controller 33 while stopping powering the host CPU 11. The SDRAM 29 refreshes the data (program) stored thereon with the self-refresh function thereof while being powered. The SDRAM 29 thus continuously stores the program and data in the suspension state S3.

In each of the hibernation state S4 and the soft-off state S5, the DC-DC converter 34 powers the embedded controller 33 while stopping powering the host CPU 11 and the SDRAM 29.

The digital still camera electrically operates in the same manner regardless of whether it is in the hibernation state S4 or the softoff state S5, and the hibernation state S4 and the soft-off state S5 are not discriminated in the following discussion.

In the mechanical-off state G3, the DC-DC converter 34 stops powering the host CPU 11, the SDRAM 29 and the embedded controller 33. However, the embedded controller 33 is still powered from the battery 36. The embedded controller 33 keeps the internal real-time clock (RTC) thereof operative.

The real-time processing CPU 12 and the host CPU 11 are powered in the operating state S0 but are not powered in each of the suspension state S3, the hibernation state S4, the soft-off state S5 and the mechanical-off state G3.

Figure 8:
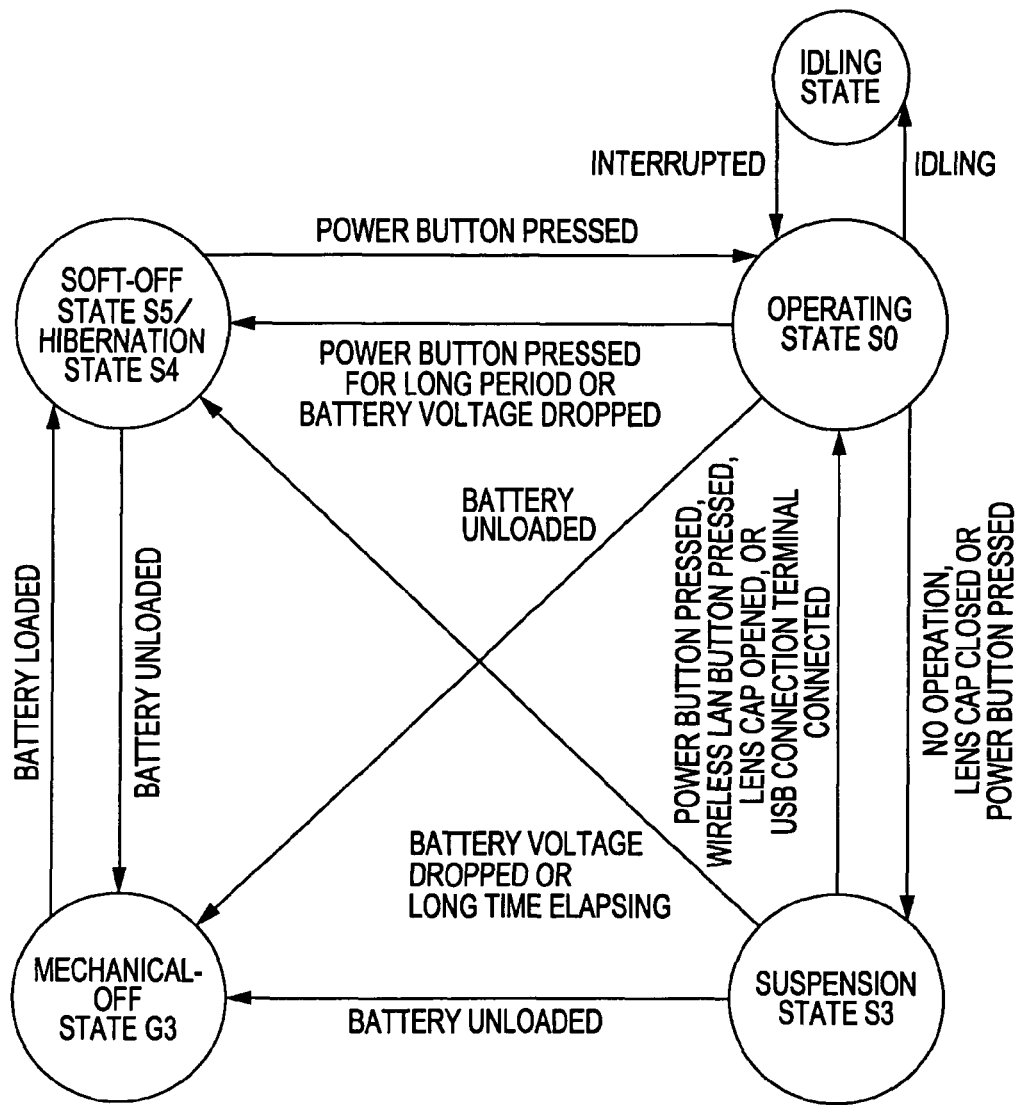
FIG. 8 illustrates state transition of the digital still camera.

FIG. 8 illustrates state transition. The digital still camera is transitioned to the hibernation state S4 (soft-off state S5) when the battery 35 is loaded in the mechanical-off state G3.

If the battery 35 is unloaded in the hibernation state S4 (soft-off state S5), the digital still camera is transitioned to the mechanical-off state G3.

If the power button is pressed on the input unit 31 in the hibernation state S4 (soft-off state S5), the digital still camera is transitioned to the operating state S0. If the power button is pressed for a period of time longer than a predetermined time in the operating state S0, the digital still camera is transitioned to the hibernation state S4 (soft-off state S5).

The digital still camera is transitioned to the suspension state S3 if the power button is pressed in the operating state S0, if the lens cap is closed in the operating state S0, or if the user performs no operation in the operating state S0 for a period of time longer than a predetermined time.

The digital still camera is transitioned to the operating state S0 if the power button is pressed in the suspension state S3, if the wireless LAN button is pressed on the input unit 31 in the suspension state S3, if the lens cap is opened in the suspension state S3, or if one end of the cable with the other end connected to another device is connected to the USB connection terminal 41 in the suspension state S3.

The digital still camera is transitioned to the hibernation state S4 (soft-off state S5) if the voltage of the battery 35 drops below a predetermined threshold value with no external power applied in the suspension state S3 or if a predetermined time has elapsed since the transition to the suspension state S3.

The digital still camera is transitioned to the mechanical-off state G3 if the battery 35 is unloaded in the suspension state S3. Similarly, the digital still camera is transitioned to the mechanical-off state G3 if the battery 35 is unloaded in the operating state S0.

If no process is performed for a predetermined period of time in the operating state S0, the digital still camera is transitioned to an idling state with a clock frequency lowered in the host CPU 11. In the idling state, the digital still camera is transitioned to the operating state S0 at regular intervals in response to regular interrupt inputs.

Figure 9:
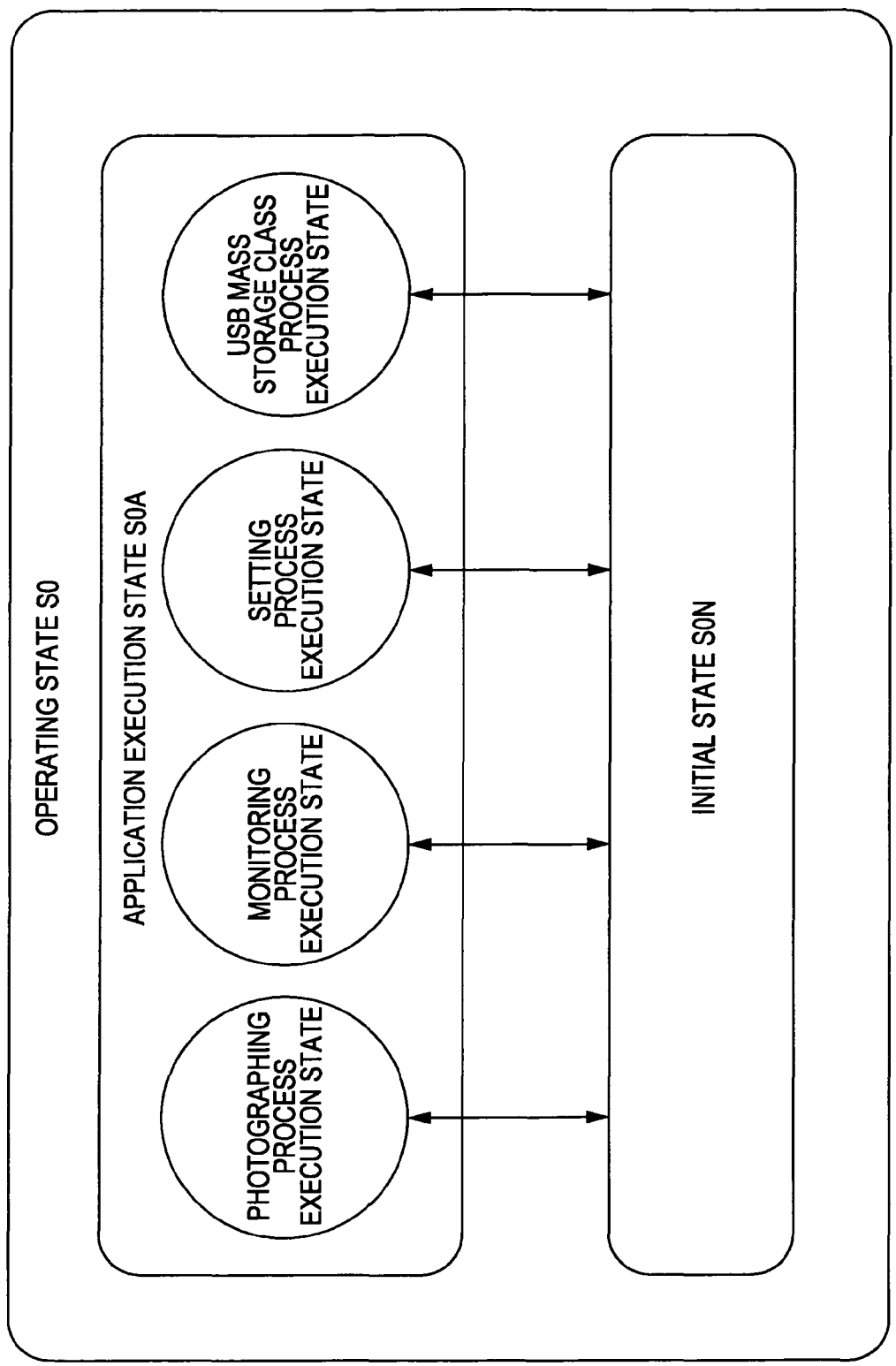
FIG. 9 illustrates states of the digital still camera.

The operating state S0 is described in detail with reference to FIG. 9. The operating states S0 include a photographing process execution state, a monitoring process execution state, a setting process execution state, other process execution state, a USB mass storage class process execution state and an initial state SON.

In the USB mass storage class process execution state, the host CPU 11 performs the USB mass storage class processing program 84.

In the initial state SON, the execution of an application is controlled. In the initial state SON, the host CPU 11 performs the application program 62 but performs none of the photographing processing program 81, the monitor processing program 82, the setting processing program 83 and the USB mass storage class processing program 84.

The digital still camera can be transitioned from the initial state SON to any of the photographing process execution state, the monitoring process execution state, the setting process execution state and the USB mass storage class process execution state. Conversely, the digital still camera is transitioned to the initial state SON from any of the photographing process execution state, the monitoring process execution state, the setting process execution state and the USB mass storage class process execution state.

The digital still camera cannot be directly transitioned from the photographing process execution state to any of the monitoring process execution state, the setting process execution state and the USB mass storage class process execution state and cannot be directly transitioned from the monitoring process execution state to any of the photographing process execution state, the setting process execution state and the USB mass storage class process execution state. The digital still camera cannot be directly transitioned from the setting process execution state to any of the photographing process execution state, the monitoring process execution state and the USB mass storage class process execution state and cannot be directly transitioned from the USB mass storage class process execution state to any of the photographing process execution state, the monitoring process execution state and the setting process execution state.

More specifically, no direct transition is permitted between the photographing process execution state, the monitoring process execution state, the setting process execution state and the USB mass storage class process execution state.

Figure 10:
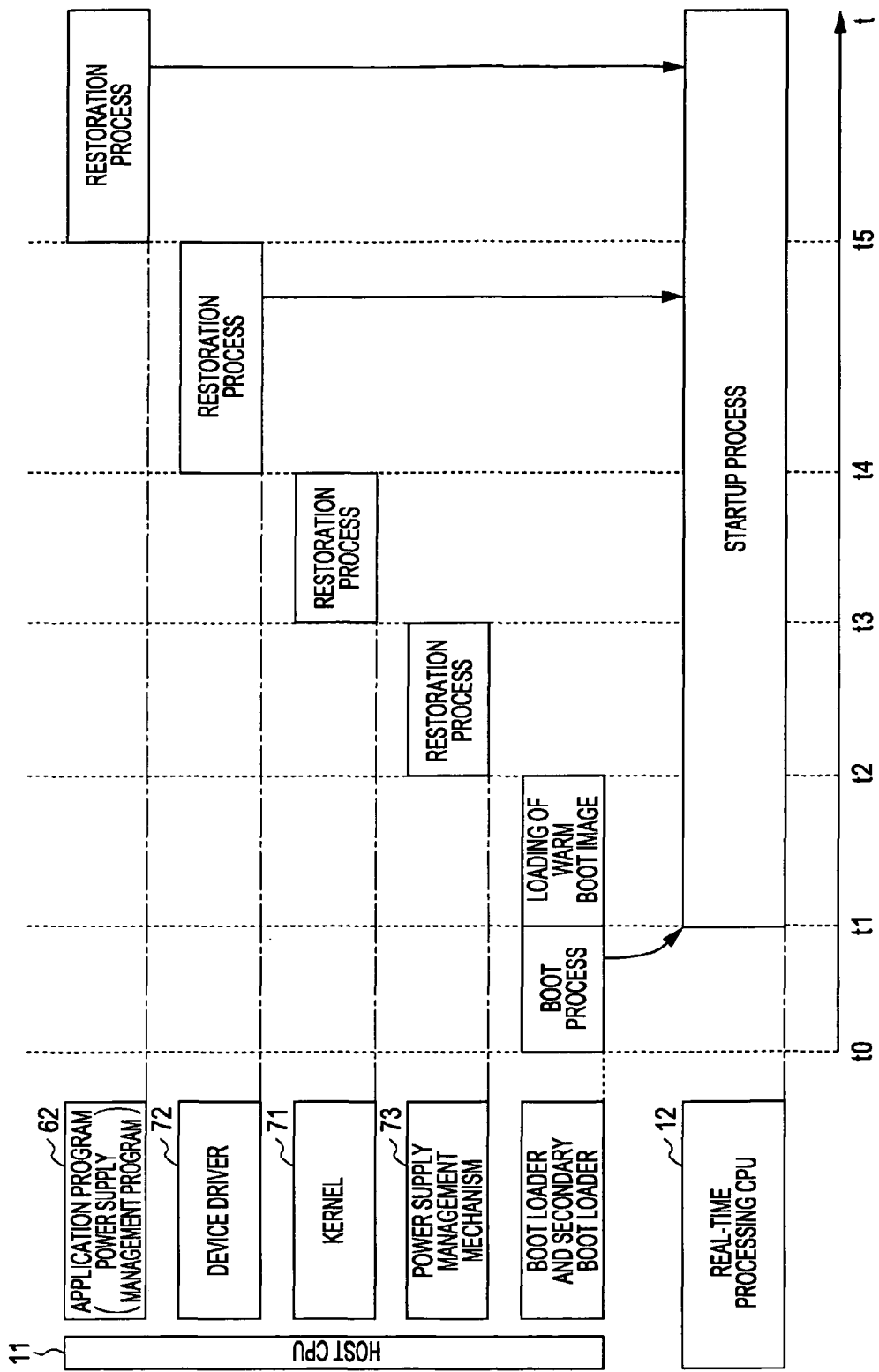
FIG. 10 illustrates a summary of a startup process of a warm boot.
Figure 11:
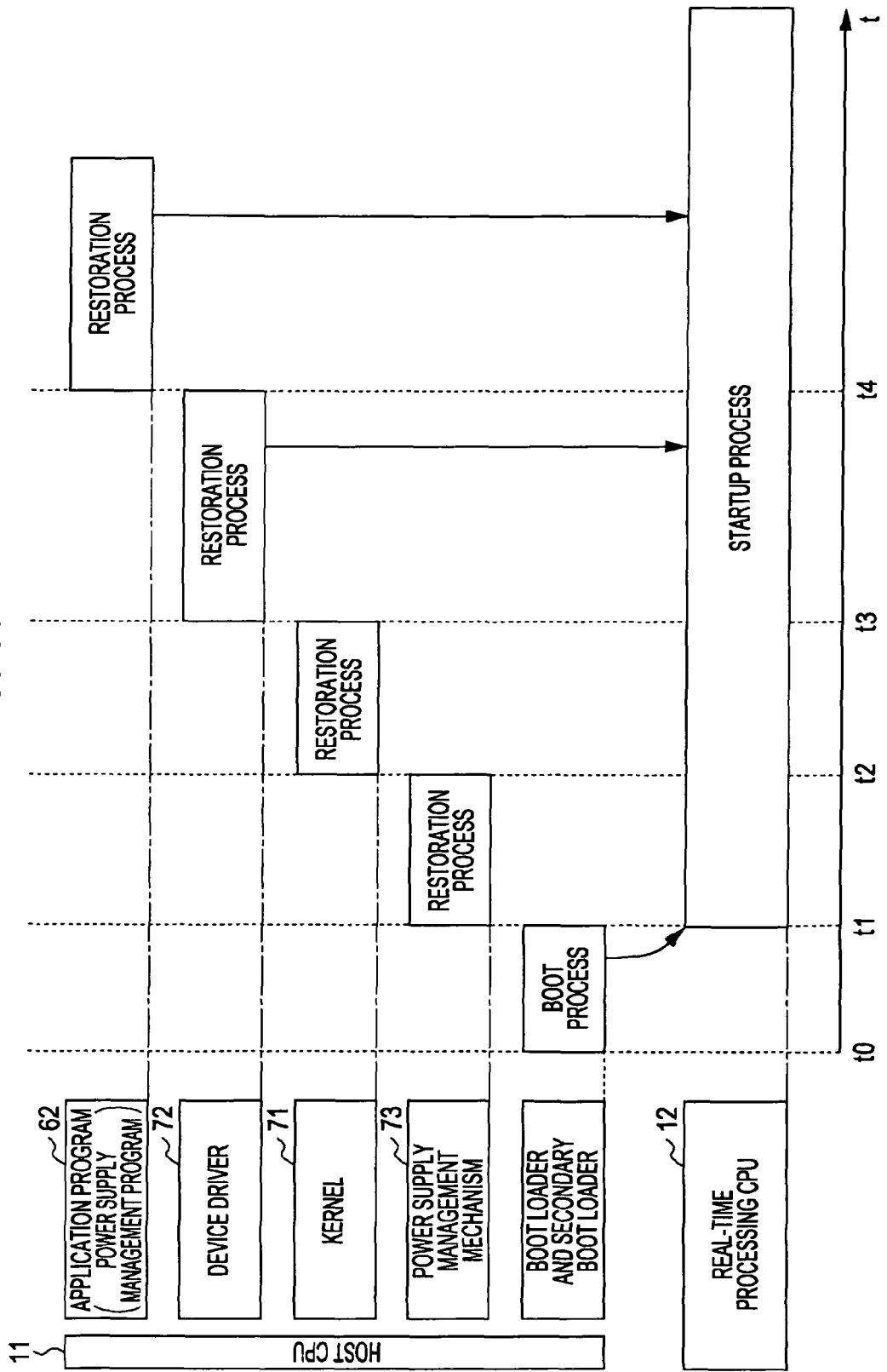
FIG. 11 illustrates a summary of a startup process of a hot boot.
Figure 12:
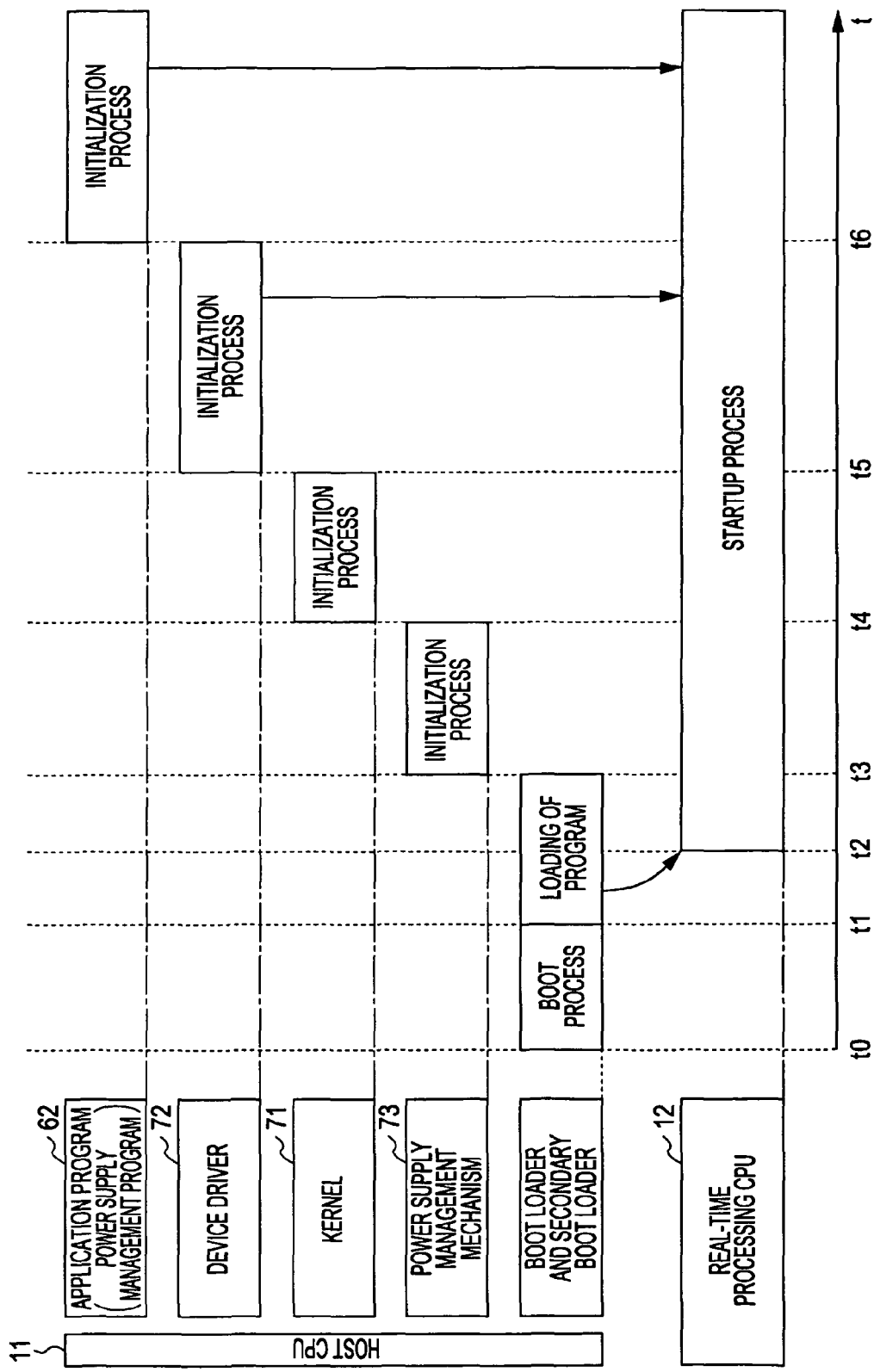
FIG. 12 illustrates a summary of a startup process of a cold boot.

The startup process is summarized with reference to FIGS. 10 through 12.

The warm boot startup is described below. The warm boot is started by loading the warm boot image, once stored on the SDRAM 29 in the operating state S0 prior to the pause, from the NAND-type flash memory 17 to the SDRAM 29.

FIG. 10 illustrates a warm boot startup procedure. At time t0, the resetting of the host CPU 11 is cleared. The host CPU 11 starts executing the boot loader stored at a predetermined address of the mask ROM 13. The host CPU 11 for executing the boot loader loads the second boot loader from the NAND-type flash memory 17 to the SDRAM 29. In response to a jump command of the boot loader, the host CPU 11 starts executing the second boot loader.

The host CPU 11 for executing the second boot loader loads the operating system 141 and application program 142 to be executed by the real-time processing CPU 12 from the NAND-type flash memory 17 to the SDRAM 29.

The host CPU 11 for executing the second boot loader clears the resetting of the real-time processing CPU 12.

The real-time processing CPU 12 with the reset state thereof cleared starts executing the program with a predetermined address of the SDRAM 29, thereby starting the operating system 141 at time t1.

The host CPU 11 going to execute the second boot loader loads the warm boot image from the NAND-type flash memory 17 to the SDRAM 29.

Upon loading the warm boot image onto the SDRAM 29, the host CPU 11 starts executing the power supply management mechanism 73 contained in the loaded warm boot image at time t2. The host CPU 11 for executing the power supply management mechanism 73 performs a restoration process by detecting states of power supplies including the DC-DC converter 34 and the battery 35 and by modifying an internal parameter in response to the detected power state.

In succession to the restoration process of the power supply management mechanism 73, the host CPU 11 starts executing the kernel 71 contained in the loaded warm boot image at time t3. The host CPU 11 for executing the kernel 71 performs a restoration process by detecting the availability state of memory space in the SDRAM 29 and modifying parameters of a process of managing resources such as the SDRAM 29.

In succession to the restoration process of the kernel 71, the host CPU 11 performs a restoration process of the device driver 72 contained in the loaded warm boot image at time t4. More specifically, the host CPU 11 performs the restoration process by detecting device states of the signal processor 16, the serial interface 19, the graphic controller 21, the memory card interface 23, the controller 25, the IDE interface 28 and the general-purpose input-output unit 32 and modifying parameters of the device driver 72 in accordance with the detected device states.

In succession to the restoration process of the device driver 72, the host CPU 11 notifies the real-time processing CPU 12 of the completion of the restoration process of the device driver 72.

Upon receiving the notification of the completion of the restoration process of the device driver 72 from the host CPU 11, the real-time processing CPU 12 performs a real-time control process by performing the real-time processing program 171 and starts communicating with the host CPU 11.

In succession to the restoration process of the device driver 72, the host CPU 11 starts a restoration process of the application program 62 contained in the loaded warm boot image at time t5. The host CPU 11 performs the restoration process of the application program 62 by setting values for the shutter speed, exposure, and zooming.

In succession to the restoration process of the application program 62, the host CPU 11 notifies the real-time processing CPU 12 of the completion of the restoration process of the application program 62. The power supply management program 86 of the application program 62 starts monitoring the state of the power supply by retrieving the parameter indicating the state of the power supply.

FIG. 11 illustrates a program that once on the SDRAM 29 in the operating state S0 immediately prior to the pause. By executing the program stored on the SDRAM 29 in the suspension state S3, the hot boot startup is performed as shown in FIG. 11.

The operating system 61, the application program 62, the operating system 141 and the application program 142, each stored in the operating state S0 immediately prior to the pause, are continuously stored on the SDRAM 29 even in the suspension state S3 and after the start of the hot boot startup process.

At time t0, the reset state of the host CPU 11 is cleared. The host CPU 11 starts executing the boot loader stored at a predetermined address of the mask ROM 13. The host CPU 11 for executing the boot loader loads the second boot loader from the NAND-type flash memory 17 to the SDRAM 29. In response to a jump command of the boot loader, the host CPU 11 starts executing the second boot loader.

As previously discussed, the SDRAM 29 continuously stores the operating system 141 and application program 142 in the suspension state S3 and even after the start of the hot boot startup process. In the hot boot startup process, the host CPU 11 for performing the second boot loader is freed from loading the operating system 141 and application program 142 to the SDRAM 29.

The host CPU 11 for performing the second boot loader clears the reset state on the real-time processing CPU 12.

The real-time processing CPU 12 cleared from the reset state thereof starts executing a command in the program with a predetermined address of the SDRAM 29, thereby starting executing the operating system 141 at time t1.

Upon clearing the reset state on the real-time processing CPU 12, the host CPU 11 starts executing the power supply management mechanism 73 stored on the SDRAM 29. The host CPU 11 for executing the power supply management mechanism 73 performs a restoration process by detecting the state of the power supplies including the DC-DC converter 34 and the battery 35 and modifying an internal parameter in response to the detected state of the power supply.

In succession to the restoration process of the power supply management mechanism 73, the host CPU 11 starts executing the kernel 71 stored on the SDRAM 29 at time t2. The host CPU 11 for executing the kernel 71 performs a restoration process by detecting the availability state of memory space in the SDRAM 29 and modifying parameters of a process of managing resources such as the SDRAM 29.

In succession to the restoration process of the kernel 71, the host CPU 11 performs, at time t3, a restoration process of the device driver 72 stored on the SDRAM 29. More specifically, the host CPU 11 performs the restoration process of the device driver 72 by detecting device states of the signal processor 16, the serial interface 19, the graphic controller 21, the memory card interface 23, the controller 25, the IDE interface 28 and the general-purpose input-output unit 32 and modifying parameters of the device driver 72 in accordance with the detected device states.

In succession to the restoration process of the device driver 72, the host CPU 11 notifies the real-time processing CPU 12 of the completion of the restoration process of the device driver 72.

Upon receiving the notification of the completion of the restoration process of the device driver 72 from the host CPU 11, the real-time processing CPU 12 performs a real-time control process by performing the real-time processing program 171 and starts communicating with the host CPU 11.

In succession to the restoration process of the device driver 72, the host CPU 11 starts, at time t4, a restoration process of the application program 62 stored on the SDRAM 29. The host CPU 11 performs the restoration process of the application program 62 by setting values for the shutter speed, exposure, and zooming.

In succession to the restoration process of the application program 62, the host CPU 11 notifies the real-time processing CPU 12 of the completion of the restoration process of the application program 62. The power supply management program 86 of the application program 62 starts monitoring the state of the power supply by retrieving the parameter indicating the state of the power supply.

In the hot boot startup process, the host CPU 11 is freed from reading the warm boot image from the NAND-type flash memory 17 and then loading the read warm boot image onto the SDRAM 29. The hot boot startup process is more quickly started than the warm boot startup process.

The cold boot is now discussed. The cold boot may be performed in the plant of the digital still camera before the shipment thereof or may be performed after updating a so-called firmware. The cold boot is performed by opening the operating system 61 and application program 62 stored on the NAND-type flash memory 17.

FIG. 12 illustrates a startup procedure of the cold boot.

The host CPU 11, cleared from the reset state thereof, starts executing the boot loader stored on a predetermined address of the mask ROM 13 at time t0. The host CPU 11 for executing the boot loader loads the second boot loader from the NAND-type flash memory 17 onto the SDRAM 29.

In response to a jump command of the boot loader, the host CPU 11 starts executing the second boot loader.

The host CPU 11 for executing the second boot loader starts loading the operating system 141 and application program 142 from the NAND-type flash memory 17 to the SDRAM 29 at time t1.

In succession to the loading of the operating system 141 and application program 142 to be executed by the real-time processing CPU 12 to the SDRAM 29, the host CPU 11 clears the real-time processing CPU 12 from the reset state thereof.

The reset-cleared real-time processing CPU 12 starts executing a command of the program with a predetermined address of the SDRAM 29 at time t2, thereby starting executing the operating system 141.

The host CPU 11 for executing the second boot loader loads the operating system 61 and application program 62 from the NAND-type flash memory 17 to the SDRAM 29.

In succession to the loading of the operating system 61 and application program 62 to the SDRAM 29, the host CPU 11 starts executing, at time t3, the power supply management mechanism 73 loaded to the SDRAM 29. The host CPU 11 for executing the power supply management mechanism 73 performs an initialization process by detecting the state of the power supplies containing the DC-DC converter 34 and the battery 35 and initializing an internal parameter in accordance with the detected power supply state.

Upon initializing the power supply management mechanism 73, the host CPU 11 starts executing, at time t4, the kernel 71 loaded to the SDRAM 29. The host CPU 11 for executing the kernel 71 performs an initialization process by detecting a size of memory space (range of addresses) of the SDRAM 29 and initializing parameters of a process managing resources such as the SDRAM 29.

Upon initializing the kernel 71, the host CPU 11 starts, at time t5, an initialization process of the device driver 72 loaded on the SDRAM 29. More specifically, the host CPU 11 performs the initialization process by detecting device states of the signal processor 16, the serial interface 19, the graphic controller 21, the memory card interface 23, the controller 25, the IDE interface 28 and the general-purpose input-output unit 32 and initializing parameters of the device driver 72 in accordance with the detected device states.

In succession to the completion of the initialization process of the device driver 72, the host CPU 11 notifies the real-time processing CPU 12 of the completion of the initialization process of the device driver 72.

Upon receiving the completion notification of the initialization process of the device driver 72 from the host CPU 11, the real-time processing CPU 12 executes the real-time processing program 171. The real-time processing CPU 12 thus performs the real-time process and starts communicating with the host CPU 11.

Subsequent to the completion of the initialization process of the device driver 72, the host CPU 11 starts, at time t6, initializing the application program 62 loaded to the SDRAM 29. In the initialization process of the application program 62, the host CPU 11 sets a variety of parameters for use in the photographing process and the monitoring process to default values.

Subsequent to the completion of the initialization process of the application program 62, the host CPU 11 notifies the real-time processing CPU 12 that the application program 62 has been initialized. The power supply management program 86 of the application program 62 starts monitoring the state of the power supply, for example by retrieving the parameter indicating the state of the power supply from the power supply management mechanism 73.

The host CPU 11 generates a warm boot image and stores the generated warm boot image onto the NAND-type flash memory 17.

When the firmware is updated, the cold boot startup process is performed to update the warm boot image on the NAND-type flash memory 17.

The host CPU 11 for executing the initialized operating system 61 may load the application program 62 from the NAND-type flash memory 17 to the SDRAM 29.

Figure 13:
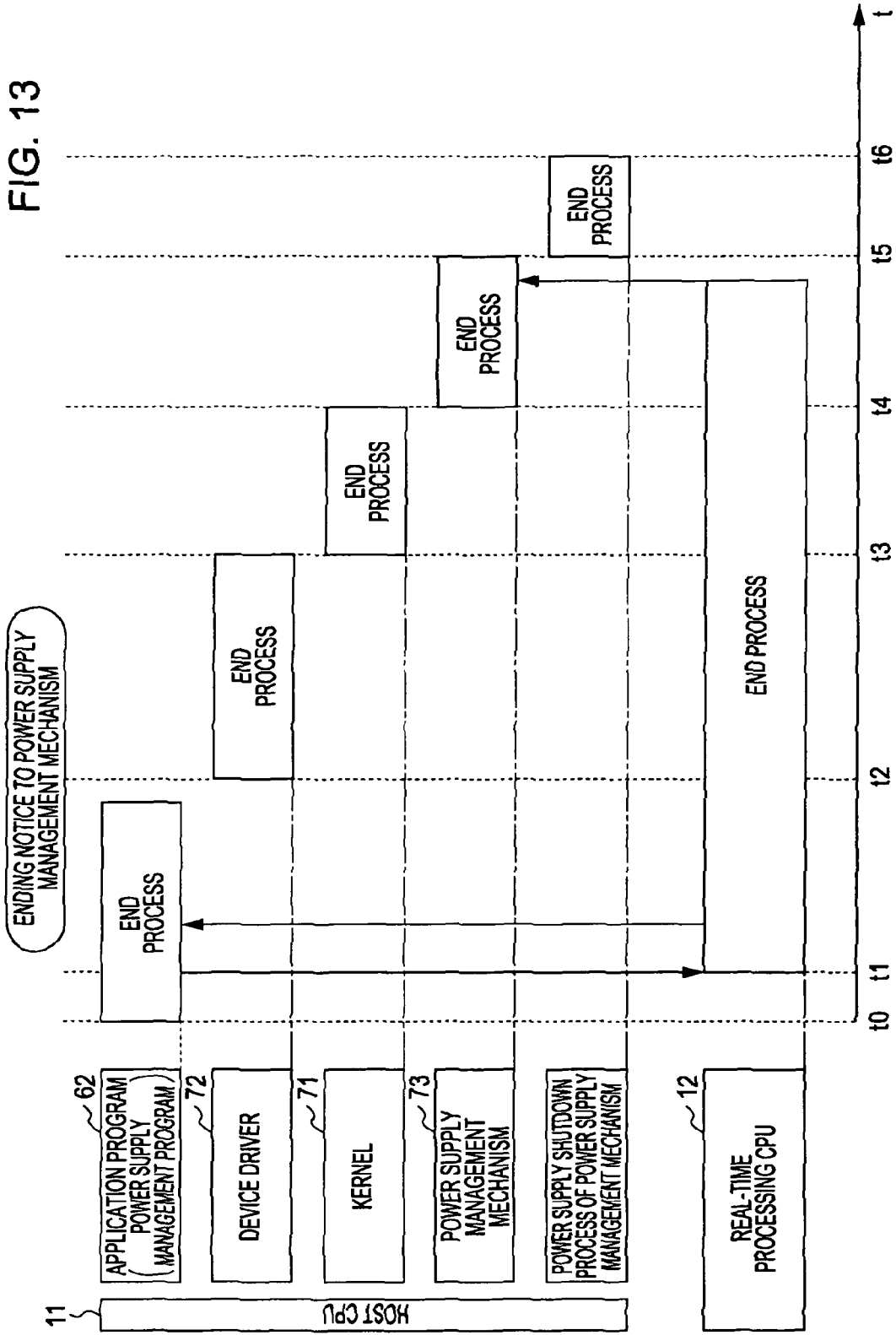
FIG. 13 illustrates a summary of a pause process.

The pause process for transitioning from the operating state S0 to the pause state is described below with reference to FIG. 13.

A start command to start the pause process is issued at time t0. The host CPU 11 for executing the application program 62 transitions the digital still camera to the initial state S0N before transitioning to the pause state. The host CPU 11 for executing the application program 62 determines whether to transition to the suspension state S3 or the hibernation state S4.

The host CPU 11 for executing the application program 62 performs an end process for closing a file storing photographed image data, for example.

The host CPU 11 for executing the application program 62 notifies the real-time processing CPU 12 of the completion of the end process at time t1.

The real-time processing CPU 12 starts an end process for returning a lens forming the optical system (not shown) to an end position.

The power supply management program 86 of the application program 62 issues a command to transition to the determined one of the suspension state S3 and the hibernation state S4, thereby notifying the power supply management mechanism 73 of the completion of the end process.

Subsequent to the completion of the end process of the application program 62, the host CPU 11 starts an end process of the device driver 72 at time t2 by ending control of devices including the signal processor 16, the serial interface 19, the graphic controller 21, the memory card interface 23, the controller 25, the IDE interface 28 and the general-purpose input-output unit 32.

Subsequent to the completion of the end process of the device driver 72, the host CPU 11 performs, at time t3, an end process on the kernel 71, e.g., ending predetermined processes including the device monitoring of the application program 62, management of resources such as the SDRAM 29, interrupt process and inter-process communications.

When the end process of the kernel 71 is completed, the host CPU 11 starts an end process of the power supply management mechanism 73 by setting a parameter in the pause state at time t4.

In response to the reception of the completion notification of the end process from the real-time processing CPU 12, the host CPU 11 for executing the power supply management mechanism 73 requests, at time t5, the embedded controller 33 to stop supplying power (cut off power) via the serial interface 19. In response to the request to stop supplying power from the host CPU 11, at time t6, the embedded controller 33 causes the DC-DC converter 34 to stop supplying power to the host CPU 11 and the real-time processing CPU 12 while continuously allowing the DC-DC converter 34 to supply power to the SDRAM 29 in order to transition to the suspension state S3. In order to transition to the hibernation state S4, the embedded controller 33 causes the DC-DC converter 34 to stop supplying power to the SDRAM 29, the host CPU 11 and the real-time processing CPU 12.

The digital still camera pauses in one of the suspension state S3 and the hibernation state S4.

The warm boot, hot boot and cold boot startup processes are described in detail below.

Figure 14:
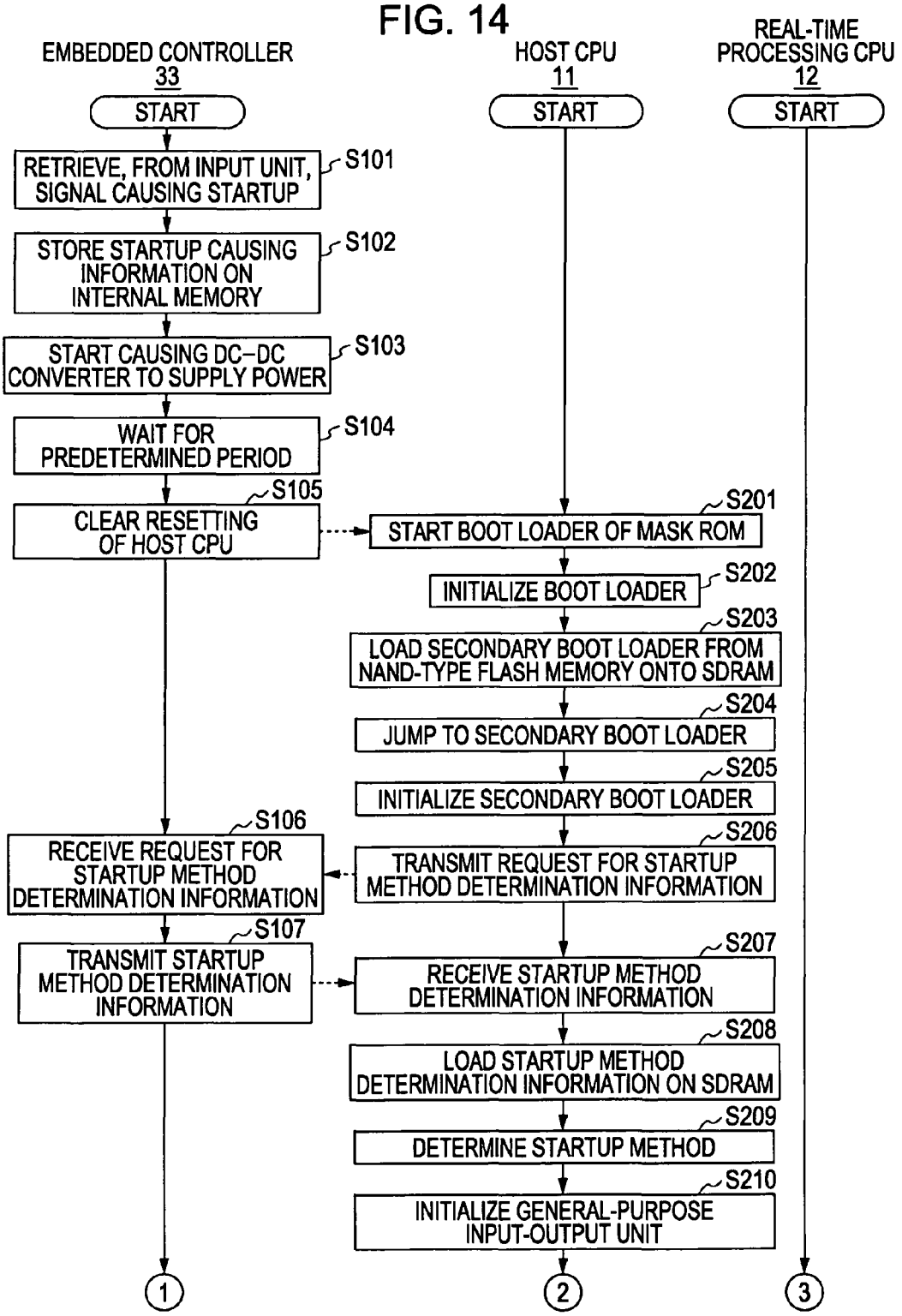
FIG. 14 is a flowchart illustrating in detail the start process of the warm boot.
Figure 15:
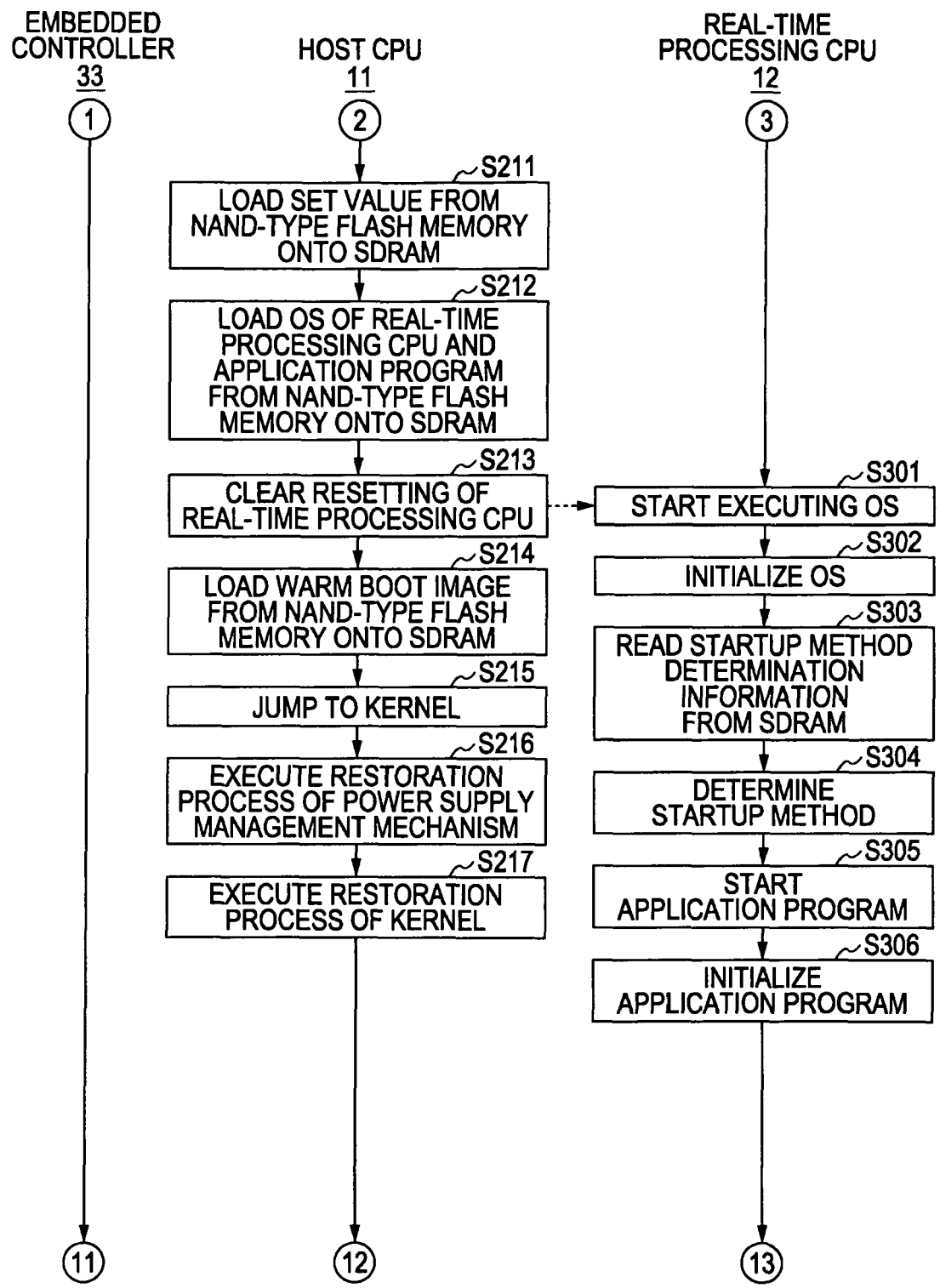
FIG. 15 is a continuation of the flowchart of FIG. 14.
Figure 16:
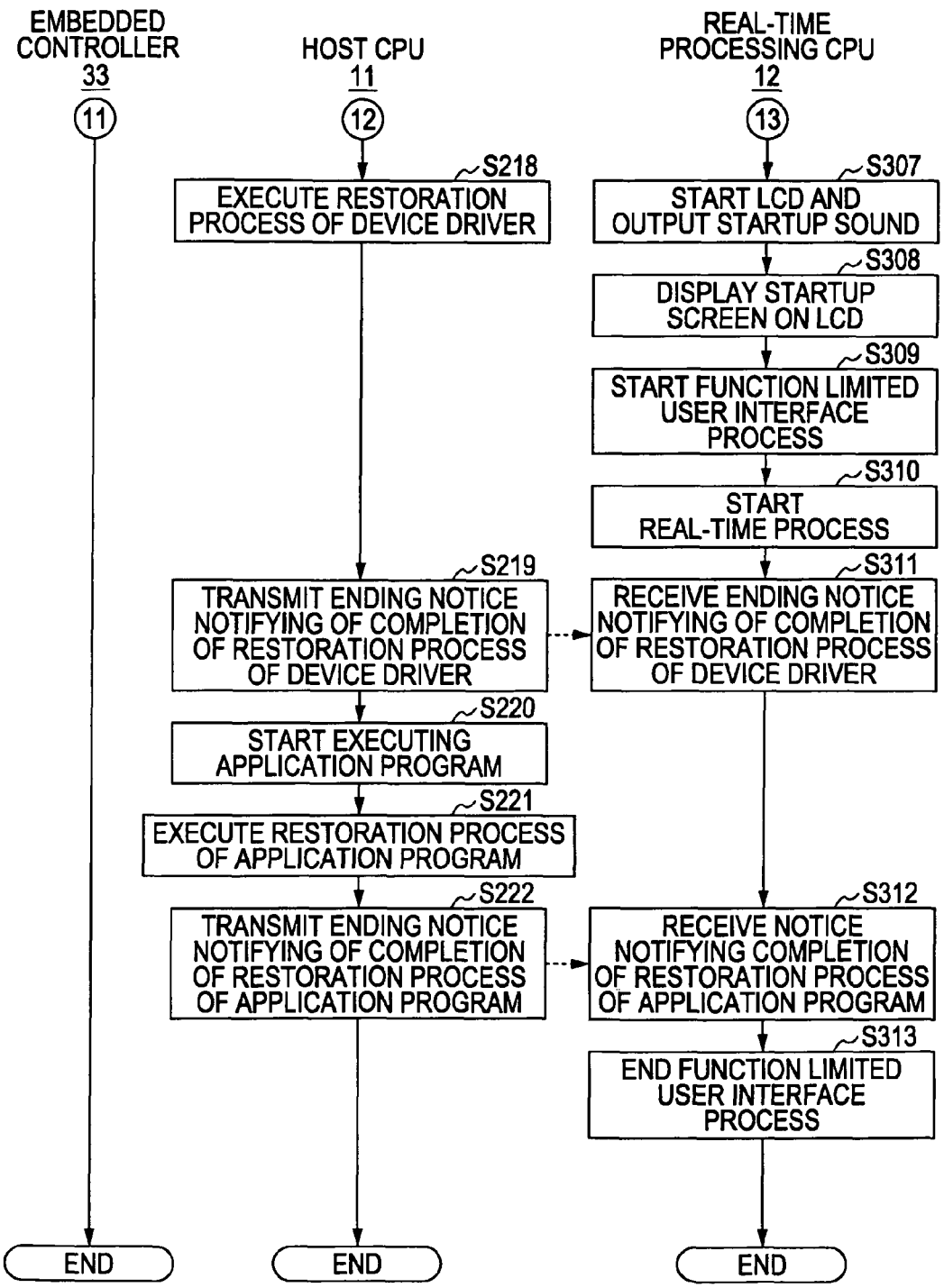
FIG. 16 is a continuation of the flowchart of FIG. 15.

FIGS. 14 through 16 are flowcharts illustrating in detail the warm boot startup process. In step S101, the embedded controller 33 for executing the startup method determination information retrieval program 203 acquires from the input unit 31 a signal serving as a trigger for the startup process. More specifically, the startup method determination information retrieval program 203 acquires from the input unit 31 the trigger signal in response to the pressing of one of the power button, the wireless LAN button and the USB button or the opening of the lens cap. In response to the acquired signal, the embedded controller 33 for executing the startup method determination information retrieval program 203 generates the startup trigger information indicating the startup trigger such as the pressing of one of the power button, the wireless LAN button and the USB button or the opening of the lens cap.

In step S102, the embedded controller 33 for executing the startup method determination information storage processing program 204 stores on the internal memory thereof the startup trigger information generated in step S101 in response to the acquired signal. More specifically, when the signal indicating the startup trigger is acquired from the input unit 31 in response to the pressing of one of the power button, the wireless LAN button and the USB button or the opening of the lens cap, the startup method determination information retrieval program 203 generates the startup trigger information indicating the startup trigger such as the pressing of one of the power button, the wireless LAN button and the USB button or the opening of the lens cap. The startup method determination information storage processing program 204 stores the generated startup trigger information on the internal memory of the embedded controller 33.

In step S103, the embedded controller 33 for executing the power supply control program 201 causes the DC-DC converter 34 to start supplying power to each block of the digital still camera. In this way, the host CPU 11 through the general-purpose input-output unit 32 are now powered.

In step S104, the embedded controller 33 waits on standby for a predetermined period of time until supplied power reaches a stabilized level and each block in the digital still camera powered is stabilized in operation.

In step S105, the embedded controller 33 for executing the other CPU reset control program 202 clears the reset state on the host CPU 11. For example, the embedded controller 33 clears the reset state on the host CPU 11 by changing the level of a reset signal on a signal line conducting the reset signal from the embedded controller 33 to the host CPU 11.

With the reset state cleared, the host CPU 11 starts the boot loader of the mask ROM 13 in step S201, thereby starting executing the boot loader. More specifically, the host CPU 11 starts the boot loader by executing a command stored at a predetermined address of the mask ROM 13 in response to a hardware interrupt for reset clearing. In step S202, the host CPU 11 initializes the boot loader.

In step S203, the host CPU 11 for executing the boot loader loads the secondary boot loader 101 from the NAND-type flash memory 17 to the SDRAM 29. In step S204, the host CPU 11 executes a jump command to the secondary boot loader 101 contained in the boot loader. Processing jumps to the secondary boot loader 101. As a result, the host CPU 11 starts executing the secondary boot loader 101.

Alternatively, the secondary boot loader 101 may be stored on the mask ROM 3, and processing may jump to the secondary boot loader 101 stored on the mask ROM 13.

In step S205, the host CPU 11 initializes the secondary boot loader 101. Since the secondary boot loader 101 contains a driver of the serial interface 19, the host CPU 11 can communicate with the embedded controller 33 via the serial interface 19.

In step S206, the host CPU 11 for executing the startup method determination information retrieval program 121 of the secondary boot loader 101 transmits a request for the startup method determination information to the embedded controller 33 via the serial interface 19.

In step S106, the embedded controller 33 for executing the startup method determination information providing program 205 receives the request for the startup method determination information from the host CPU 11 via the serial interface 19. In step S107, the embedded controller 33 for executing the startup method determination information providing program 205 transmits the startup method determination information stored on the internal memory of the embedded controller 3 to the host CPU 11 via the serial interface 19.

In step S207, the host CPU 11 for executing the startup method determination information retrieval program 121 of the secondary boot loader 101 receives the startup method determination information from the embedded controller 33 via the serial interface 19.

In step S208, the host CPU 11 for executing the startup method determination information retrieval program 121 of the secondary boot loader 101 stores the received startup method determination information on the SDRAM 29. In this case, the host CPU 11 stores the startup method determination information on a predetermined region of the storage area of the SDRAM 29.

In step S209, the host CPU 11 for executing the startup method determination program 122 of the secondary boot loader 101 determines the startup method based on the startup method determination information received in step S207. In this case, the host CPU 11 determines the warm boot startup as the startup method. The startup method determination program 122 determines the warm boot startup as the startup method if the pause state information indicates the suspension state S3 with the battery loading information indicating that the battery is unloaded or if the pause state information indicates the hibernation state S4.

In step S210, the host CPU 11 for executing the secondary boot loader 101 initializes the general-purpose input-output unit 2.

In step S211, the host CPU 11 for executing the set value reading program 123 of the secondary boot loader 101 loads set values required in the startup operation from the NAND-type flash memory 17 to the SDRAM 29 set.

In step S212, the host CPU 11 for executing the other CPU program reading program 124 of the secondary boot loader 101 loads the operating system 141 and application program 142 of the real-time processing CPU 12 from the NAND-type flash memory 7 to the SDRAM 29.

In step S213, the host CPU 11 for executing the secondary boot loader 101 clears the reset state on the real-time processing CPU 12.

With the reset state cleared, the real-time processing CPU 12 starts executing the operating system 141 loaded on the SDRAM 29 in step S301. More specifically, the real-time processing CPU 12 starts executing the operating system 141 by executing a command stored at a predetermined address of the SDRAM 29 in response to a hardware interrupt or a software interrupt for reset clearing. In step S302, the host CPU 11 initializes the operating system 141.

In step S303, the real-time processing CPU 12 for executing the startup method determination information retrieval program 161 of the operating system 141 reads the startup method determination information stored on the SDRAM 29 in step S208. In step S304, the real-time processing CPU 12 for executing the startup method determination program 162 of the operating system 141 determines the startup method based on the startup method determination information read in step S303 in the same manner as in step S209. In this case, the warm boot startup is determined as the startup method.

In step S305, the real-time processing CPU 12 for executing the operating system 141 starts the application program 142. In step S306, the real-time processing CPU 12 initializes the application program 142.

In step S307, the real-time processing CPU 12 for executing the application program 142 controls the graphic controller 21, thereby causing the LCD 20 to display data and one of a loudspeaker (not shown) and a buzzer (not shown) to emit a startup sound.

In step S308, the real-time processing CPU 12 for executing the startup screen displaying program 173 of the application program 142 controls the graphic controller 21, thereby causing the LCD 20 to display a startup screen.

In step S309, the real-time processing CPU 12 for executing the GUI processing program 172 of the application program 142 starts a user interface process for acquiring a user command from the input unit 31 shared with the host CPU 11. The user interface process has functions smaller in number than the application program 62, i.e., has limited number of functions.

In step S310, the real-time processing CPU 12 for executing the real-time processing program 171 of the application program 142 starts a real-time control process on the optical system (not shown), the CCD 14, the analog front end 15 and the signal processor 16.

If the startup trigger information of the startup method determination information indicates the opening of the lens cap in step S310, the real-time processing CPU 12 may initialize the optical system (not shown), the CCD 14, the analog front end 15 and the signal processor 16 in the real-time control process.

The host CPU 11 performs steps S214 through S218 while the real-time processing CPU 12 performs steps S301 through S310. More specifically, the host CPU 11 for executing the warm boot image reading program 125 of the secondary boot loader 101 loads the warm boot image from the NAND-type flash memory 17 to the SDRAM 29 in step S214.

In step S215, the host CPU 11 executes a jump command to the kernel 71 contained in the secondary boot loader 101. Processing jumps to the kernel 71. As a result, the host CPU 11 starts executing the operating system 61.

In step S216, the host CPU 11 for executing the operating system 61 performs a restoration process of the power supply management mechanism 73 by detecting the state of the power supplies such as the DC-DC converter 34 and the battery 35 and modifying the internal parameter in response to the detected state of the power supplies.

In step S217, the host CPU 11 for executing the operating system 61 performs a restoration process of the kernel 71 by detecting the availability state of memory space in the SDRAM 29 and modifying parameters of a process of managing resources such as the SDRAM 29.

In step S218, the host CPU 11 for executing the operating system 61 performs a restoration process of the device driver 72 by detecting device states of the signal processor 16, the serial interface 19, the graphic controller 21, the memory card interface 23, the controller 25, the IDE interface 28 and the general-purpose input-output unit 32 and modifying parameters of the device driver 72 in accordance with the detected device states.

In step S219, the host CPU 11 for executing the operating system 61 notifies the real-time processing CPU 12 of the completion of the restoration process of the device driver 2 via the bus.

In step S311, the real-time processing CPU 12 for executing the operating system 141 receives the completion notification of the restoration process of the device driver 72 from the host CPU 11 via the bus.

In step S220, the host CPU 11 for executing the operating system 61 starts executing the application program 62. In step S221, the host CPU 11 performs a restoration process of the application program 62, such as setting values for shutter speed, exposure, and zooming.

The digital still camera proceeds to the initial state SON subsequent to step S221.

In step S222, the host CPU 11 notifies the real-time processing CPU 12 of the completion of the restoration process of the application program 62 via the bus.

In step S312, the real-time processing CPU 12 receives the completion notification of the restoration process of the application program 62 from the host CPU 11 via the bus.

In step S313, the real-time processing CPU 12 for executing the application startup completion control program 163 of the operating system 141 ends the GUI processing program 172 of the application program 142, thereby completing a user interface process having limited number of functions. The warm boot startup process thus ends.

Through the warm boot startup process, the digital still camera can quickly transition from the pause state to the initial state SON.

Figure 18:
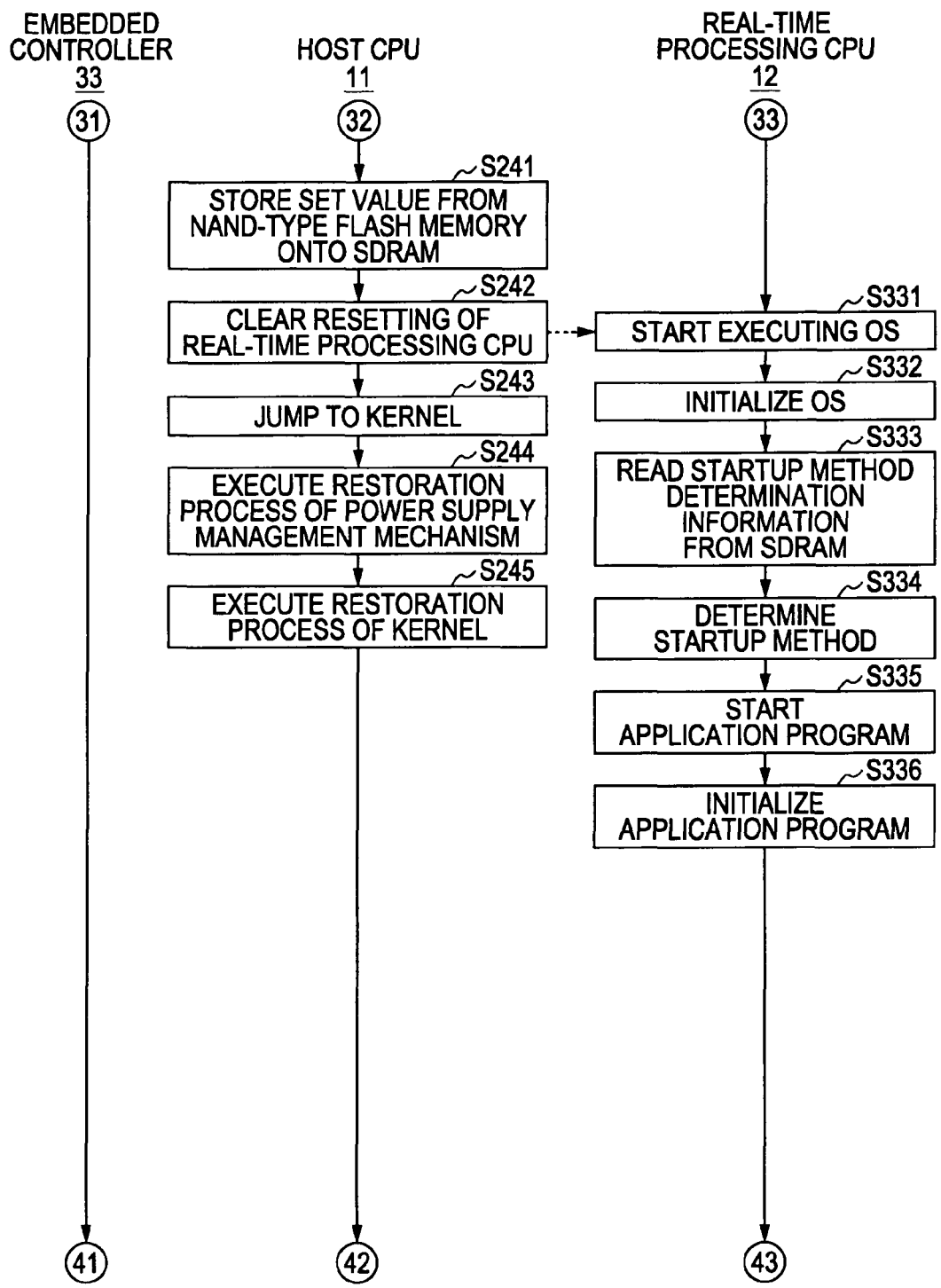
FIG. 18 is a continuation of the flowchart of FIG. 17.
Figure 19:
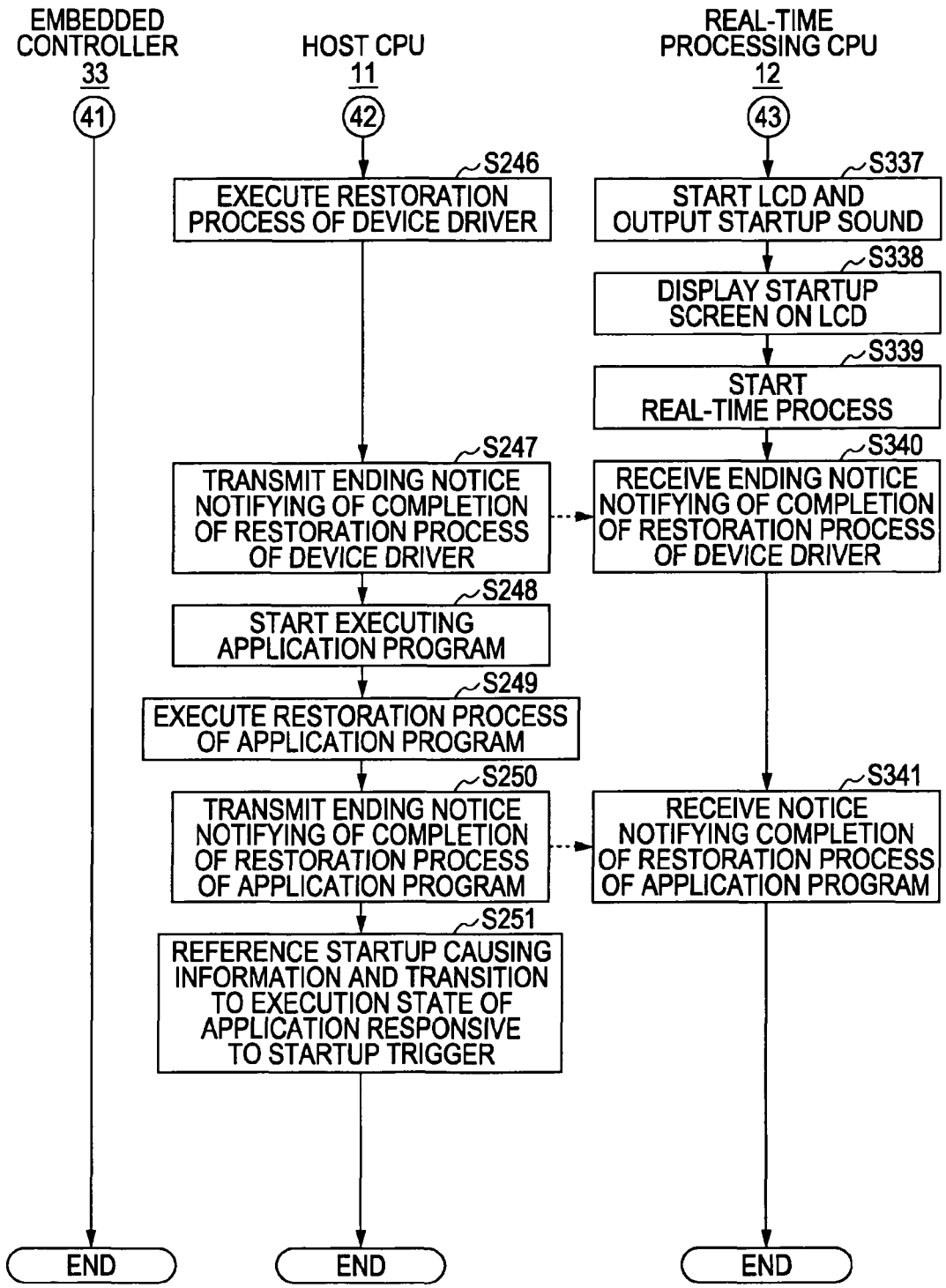
FIG. 19 is a continuation of the flowchart of FIG. 18.

The hot boot startup process is described in detail below with reference to flowcharts of FIGS. 17 through 19.

Steps S131 through S137 of the embedded controller 33 are respectively identical to steps S101 through S107 of FIG. 14, and the discussion thereof is omitted here.

Steps S231 through S238 of the host CPU 11 are respectively identical to steps S201 through S208 of FIG. 14, and the discussion thereof is omitted herein.

In step S239, the host CPU 11 for executing the startup method determination program 122 of the secondary boot loader 101 determines the startup method based on the startup method determination information received in step S237. In this case, the host CPU 11 determines the hot boot startup method as the startup method. If the pause state information indicates the suspension state S3 with the battery loading information indicating that the battery is not unloaded, the startup method determination program 122 determines the hot boot startup method as the startup method.

Steps S240 and S241 of the host CPU 11 are respectively identical to step S210 and S211 of FIGS. 14 and 15, and the discussion thereof is omitted here.

In step S242, the host CPU 11 for executing the secondary boot loader 101 clears the reset state on the real-time processing CPU 12.

Steps S331 through S333 of the real-time processing CPU 12 are respectively identical to steps S301 through S303 of FIG. 15, and the discussion thereof is omitted here.

In step S334, the real-time processing CPU 12 for executing the startup method determination program 162 of the operating system 141 determines the startup method based on the startup method determination information read in step S333 in the same manner as in step S239. The real-time processing CPU 12 determines the hot boot startup method as the startup method.

Steps S335 through S338 of the real-time processing CPU 12 are respectively identical steps S305 through S308 of FIGS. 15 and 16, and the discussion thereof is omitted here.

In step S339, the real-time processing CPU 12 for executing the real-time processing program 171 of the application program 142 starts a real-time control process on the optical system (not shown), the CCD 14, the analog front end 15 and the signal processor 16.

In this case, the real-time processing CPU 12 executes the GUI processing program 172 in a controlled manner. The real-time processing CPU 12 thus performs a user interface process for acquiring a user command from the input unit 31 shared with the host CPU 11. In this case, the real-time processing CPU 12 performs the user interface process with the function thereof limited, namely, with the functions thereof smaller in number than the application program 62.

The host CPU 11 starts up extremely quickly in the hot boot, and a quick startup results with the real-time processing CPU 12 not executing the GUI processing program 172.

Steps S331 through S339 are performed by the real-time processing CPU 12 while steps S243 through S246 are performed by the host CPU 11 in parallel. More specifically, in step S243, the host CPU 11 executes a jump command to the kernel 1 contained in the secondary boot loader 101, thereby jumping to the kernel 71. The host CPU 11 starts executing the operating system 61.

Steps S244 through S246 of the host CPU 11 are respectively identical to steps S216 through S218 of FIGS. 15 and 16, and the discussion thereof is omitted here.

Steps S247 through S250 of the host CPU 11 are respectively identical to steps S219 through S222 of FIG. 16, and the discussion thereof is omitted here. Also, steps S340 and step S341 of the real-time processing CPU 12 are respectively identical to steps S311 and S312 of FIG. 16 and the discussion thereof is omitted here.

In step S251 subsequent to step S250, the host CPU 11 for executing the state transition processing program 85 of the application program 62 references the startup trigger information of the startup method determination information stored on the SDRAM 29. The host CPU 11 then transitions the digital still camera to an execution state of the application responsive to the trigger type. The hot boot startup process thus ends. If the startup is triggered by the pressing of the power button on the input unit 31, the state transition processing program 85 transitions the digital still camera to the monitoring process execution state in step S251 by starting the monitor processing program 82. If the startup is triggered by the opening of the lens cap, the state transition processing program 85 transitions the digital still camera to the photographing process execution state in step S251 by starting the photographing processing program 81.

Through the hot boot startup process, the digital still camera is quickly started up and transitioned to the execution state responsive to the trigger type in the operating state S0.

Figure 20:
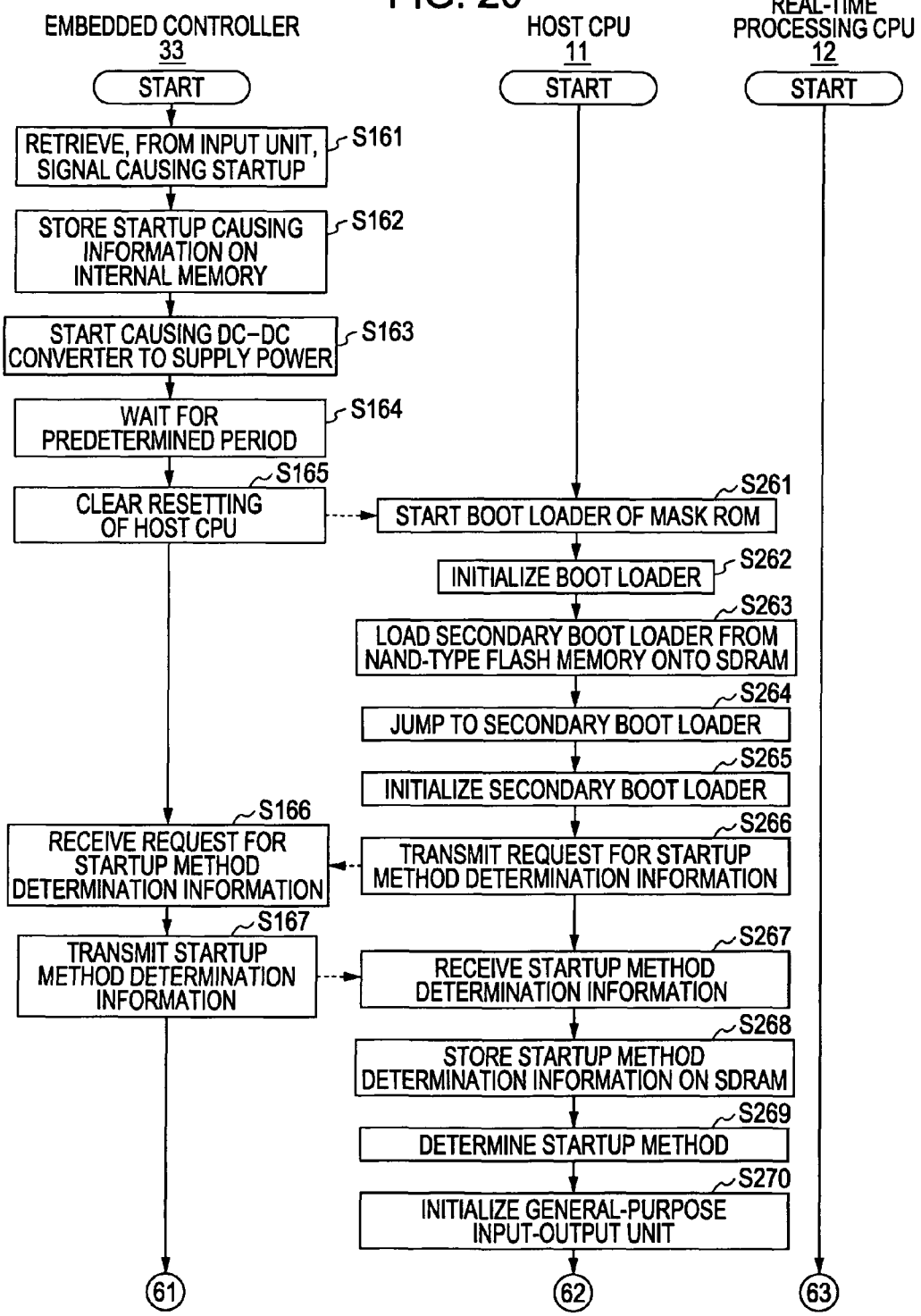
FIG. 20 is a flowchart illustrating in detail the startup process of the cold boot.
Figure 21:
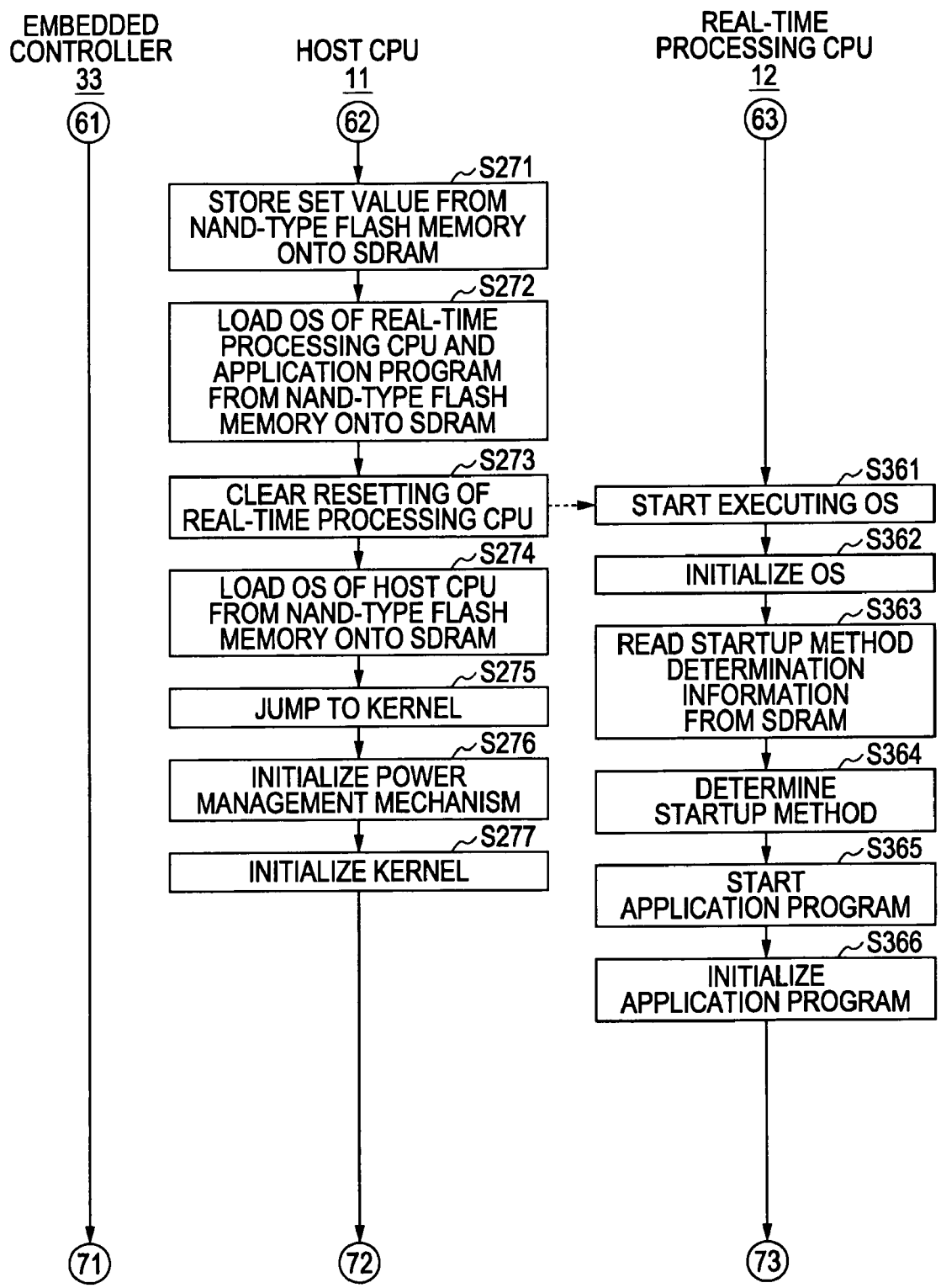
FIG. 21 is a continuation of the flowchart of FIG. 20.
Figure 22:
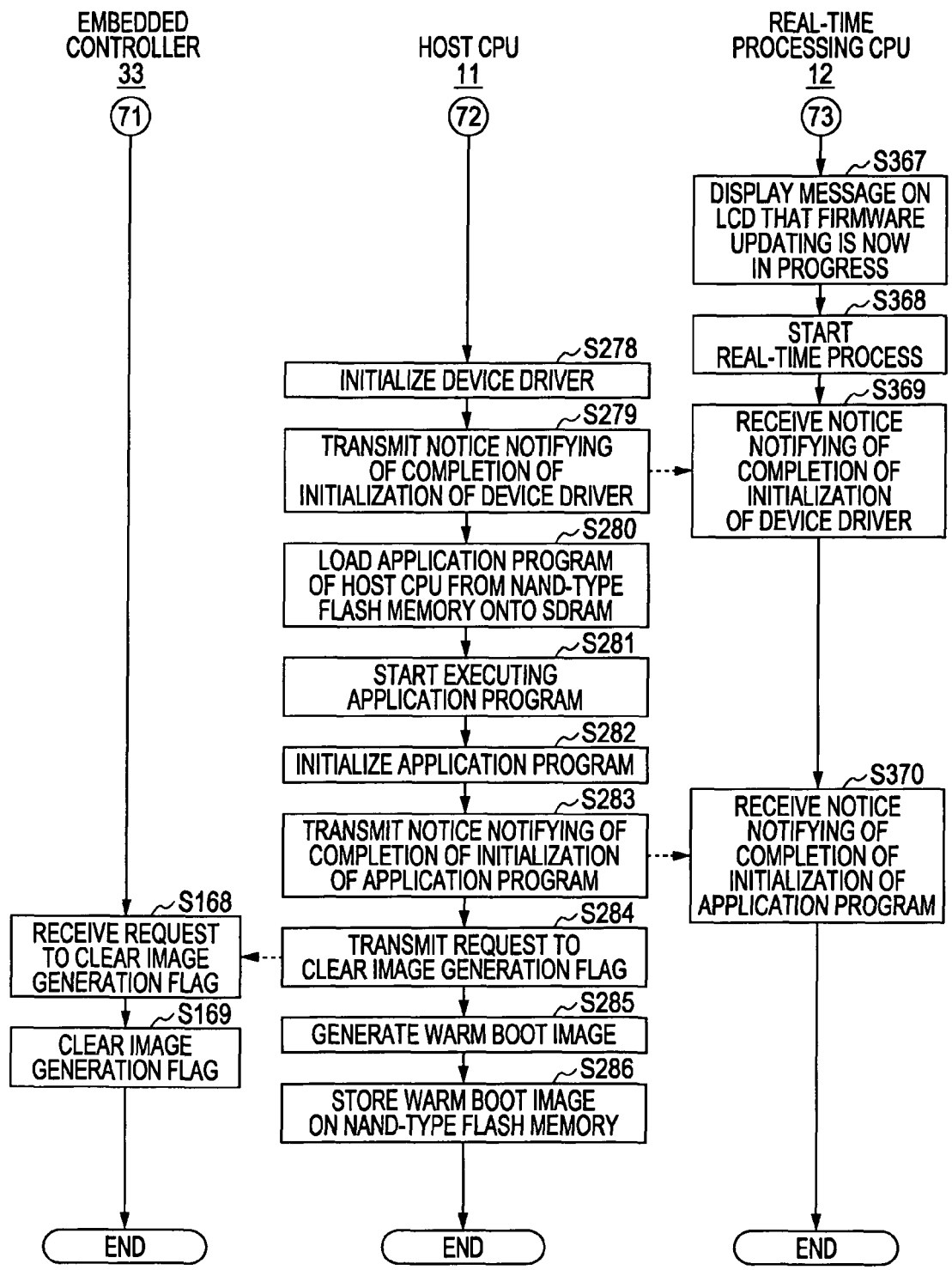
FIG. 22 is a continuation of the flowchart of FIG. 21.

The cold boot startup process is described in detail with reference to FIGS. 20 through 22. The cold boot startup process is typically performed when the digital still camera is shipped from the plant thereof or when a so-called firmware thereof is updated.

Steps S161 through S167 of the embedded controller 33 are respectively identical to steps S101 through S107 of FIG. 14 and the discussion thereof is omitted here.

Steps S261 through S268 of the host CPU 11 are respectively identical to steps S201 through S208 of FIG. 14 and the discussion thereof is omitted here.

In step S269, the host CPU 11 for executing the startup method determination program 122 of the secondary boot loader 101 determines the startup method based on the startup method determination information received in step S267. In this case, the cold boot startup method is determined as the startup method.

In step S269, the host CPU 11 for executing the startup method determination program 122 references an image generation flag contained in the pause state information. If the image generation flag is set, a warm boot image is generated. The host CPU 11 determines the cold boot startup method as the startup method.

If an updated firmware is acquired and the user requests the firmware to be updated, the image generation flag is to be set in a pause process to be discussed later.

Steps S270 through S273 of the host CPU 11 are respectively identical to steps S210 through S213 of FIGS. 14 and 15, and the discussion thereof is omitted here.

Steps S361 through S263 of the real-time processing CPU 12 are respectively identical to steps S301 through S303 of FIG. 15, and the discussion thereof is omitted here.

In step S364, the real-time processing CPU 12 for executing the startup method determination program 162 of the operating system 141 determines the startup method based on the startup method determination information read in step S363 in the same manner as in step S269. The real-time processing CPU 12 determines the cold boot startup method as the startup method.

Steps S365 and S366 of the real-time processing CPU 12 are respectively identical to steps S305 and S306 of FIG. 15, and the discussion thereof is omitted here.

In step S367, the real-time processing CPU 12 for executing the application program 142 controls the real-time processing CPU 12, thereby causing the LCD 20 to display an indication that the updating of the firmware is in progress.

The user can thus know that the firmware is currently being updated.

If a display control to display the indication that the updating of the firmware is in progress is left to the responsibility of the host CPU 11, the warm boot image displaying the indication that the updating of the firmware is in progress is generated. Since the real-time processing CPU 12 performs the display control process to display the indication, the indication that the updating of the firmware is in progress is not displayed even if the warm boot startup process is executed using the generated warm boot image.

In step S368, the real-time processing CPU 12 for executing the real-time processing program 171 of the application program 142 starts performing a real-time control process on the optical system (not shown), the CCD 14, the analog front end 15 and the signal processor 16.

In this case, the real-time processing CPU 12 executes the GUI processing program 172 in a controlled manner. The real-time processing CPU 12 thus performs a user interface process for acquiring a user command from the input unit 31 shared with the host CPU 11. In this case, the real-time processing CPU 12 performs the user interface process with the function thereof limited, namely, with the functions thereof smaller in number than the application program 62. The real-time processing CPU 12 thus executes the startup screen displaying program 173, thereby displaying the startup screen on the LCD 20 in a restrained manner.

Steps S361 through S368 are performed by the real-time processing CPU 12 while steps S274 through S278 are performed by the host CPU 11 in parallel. More specifically, in step S274, the host CPU 11 for executing the secondary boot loader 101 loads the operating system 61 from the NAND-type flash memory 17 to the SDRAM 29.

In step S275, the host CPU 11 executes a jump command to the kernel 71 contained in the secondary boot loader 101, thereby jumping to the kernel 71. The host CPU 11 starts executing the operating system 61.

In step S276, the host CPU 11 for executing the power supply management mechanism 73 of the operating system 61 performs an initialization process of the power supply management mechanism 73 by detecting the state of the power supplies including the DC-DC converter 34 and the battery 35 and initializing the internal parameter in accordance with the detected state of the power supplies.

In step S277, the host CPU 11 for executing the kernel 71 of the operating system 61 performs an initialization process on the kernel 71 by detecting the availability state of memory space in the SDRAM 29 and modifying parameters of a process of managing resources such as the SDRAM 29.

In step S278, the host CPU 11 executing the operating system 61 performs an initialization process on the device driver 72 by detecting devices and states of the devices including the signal processor 16, the serial interface 19, the graphic controller 21, the memory card interface 23, the controller 25, the IDE interface 28 and the general-purpose input-output unit 32 and initializing parameters of the device driver 72 in accordance with the detection results.

In step S279, the host CPU 11 for executing the operating system 61 notifies the real-time processing CPU 12 of the completion of the initialization process of the device driver 72 via the bus.

In step S369, the real-time processing CPU 12 for executing the operating system 141 receives the completion notification of the initialization process of the device driver 72 from the host CPU 11 via the bus.

In step S280, the host CPU 11 for executing the operating system 61 loads the application program 62 from the NAND-type flash memory 17 to the SDRAM 29. In step S281, the host CPU 11 for executing the operating system 61 starts executing the application program 62.

In step S282, the host CPU 11 initializes the application program 62. The digital still camera is transitioned to the initial state S0N subsequent to step S282.

In step S283, the host CPU 11 notifies the real-time processing CPU 12 of the completion of the initialization process of the application program 62 via the bus.

In step S370, the real-time processing CPU 12 receives the completion notification of the initialization process of the application program 62 from the host CPU 11 via the bus.

In step S284, the host CPU 11 for executing the pause state information providing program 75 transmits a request to clear the image generation flag to the embedded controller 33 via the serial interface 19.

In step S168, the embedded controller 33 for executing the startup method determination information retrieval program 203 receives the request to clear the image generation flag from the host CPU 11 via the serial interface 19.

In step S169, the embedded controller 33 for executing the startup method determination information storage processing program 204 clears the image generation flag contained in the pause state information.

In step S285, the host CPU 11 for executing the warm boot image generating program 78 of the operating system 61 reads the program and data stored on the SDRAM 29 and generates the warm boot image. More specifically, the warm boot image generating program 78 generates the warm boot image using the program and data loaded on the SDRAM 29 in the initial state S0N of the operating state S0.

In step S286, the host CPU 11 for executing the warm boot image generating program 78 of the operating system 61 causes the NAND-type flash memory 17 to store the warm boot image generated in step S285, thereby completing the cold boot startup process. In step S286, for example, the warm boot image generating program 78 stores the generated warm boot image on the NAND-type flash memory 17 in a manner such that the generated warm boot image overwrites the warm boot image stored heretofore on the NAND-type flash memory 17.

Through the cold boot startup process, the warm boot image containing the updated firmware is generated and stored on the NAND-type flash memory 17.

An end process to be discussed below may be performed immediately subsequent to step S286.

In one option, after verifying that the warm boot image has been normally generated, the host CPU 11 may transmit a request to clear the image generation flag to the embedded controller 33 via the serial interface 19. The embedded controller 33 may receive the request to clear the image generation flag and clear the image generation flag contained in the pause state information. In this option, the image generation flag is cleared only when the warm boot image has been normally generated. The warm boot image is thus generated more reliably.

In another option, the image generation flag may be cleared after the warm boot image is normally stored on the NAND-type flash memory 17.

In yet another option, the digital still camera is set to pause after the completion of the cold boot startup process, and is then started in the warm boot method using the warm boot image generated in step S285. The image generation flag is cleared only when the digital still camera is normally started. In this way, the image generation flag is cleared only when the digital still camera is normally started using the warm boot image.

In still another option, an image generated flag indicating whether the warm boot image is generated is contained together with the image generation flag in the pause state information. If the warm boot image is generated, the image generated flag is set. At the next startup, the set image generated flag and the image generation flag are referenced, the warm boot startup method is determined as the startup method, and the restoration process of the operating system 61 is completed. The image generated flag and the image generation flag are then cleared.

With the image generated flag reset and the image generation flag set, the cold boot startup method is determined as the startup method. With the image generated flag reset and the image generation flag reset, the startup method is determined based on the pause state to transition to and the history of battery loading of the battery 35 in the pause state.

The pause process is described below with reference to a flowchart of FIG. 23.

In step S501, the host CPU 11 for executing the state transition processing program 85 of the application program 62 transitions the digital still camera to the initial state S0N of the operating state S0 by ending one of the execution of the photographing processing program 81, the monitor processing program 82, the setting processing program 83 and the USB mass storage class processing program 84.

In step S502, the host CPU 11 for executing the pause state determination program 74 of the operating system 61 determines the pause state to transition to. More specifically, the pause state determination program 74 determines whether to transition to the suspension state S3 or the hibernation state S4.

In step S502, the pause state determination program 74 determines the suspension state S3 as the pause state to transition to if the power button is pressed on the input unit 31 with the output voltage of the battery 35 equal to or higher than the threshold value or if the lens cap is closed with the output voltage of the battery 35 equal to or higher than the threshold value.

In step S502, the pause state determination program 74 determines the hibernation state S4 as the pause state to transition to if the output voltage of the battery 35 is lower than the threshold value or if the power button is continuously pressed for a period of time longer than a predetermined time.

In step S503, the host CPU 11 for executing the pause state information providing program 75 of the operating system 61 transmits, to the embedded controller 33 via the serial interface 19, the pause state information indicating the pause state to transition to.

In step S601, the embedded controller 33 for executing the startup method determination information retrieval program 203 receives the pause state information from the host CPU 11 via the serial interface 19. In step S602, the embedded controller 33 for executing the startup method determination information storage processing program 204 stores the pause state information received in step S601 onto the internal memory of the embedded controller 33.

The updated firmware, namely, one of the operating system 61 and the application program 62 may be acquired and the user may request the firmware to be updated. In step S503, the pause state information containing the set image generation flag is transmitted. In step S601, the pause state information containing the set image generation flag is received. In step S602, the pause state information containing the set image generation flag is stored onto the internal memory of the embedded controller 33.

The updated firmware may not be acquired, or the user may not request the firmware to be updated even if the updated firmware is acquired. In such a case, the pause state information containing the cleared image generation flag is transmitted in step S503. In step S601, the pause state information containing the cleared image generation flag is received. In step S602, the pause state information containing the cleared image generation flag is stored on the internal memory of the embedded controller 33.

In step S603, the embedded controller 33 for executing the battery loading detection program 206 detects the output voltage of the DC-DC converter 34, thereby determining whether the battery 35 is loaded. The embedded controller 33 for executing the startup method determination information retrieval program 203 generates the battery loading information in response to the detection results of the loading of the battery 35.

In step S604, the embedded controller 33 for executing the startup method determination information storage processing program 204 stores on the internal memory thereof the battery loading information responsive to the detection results of the loading of the battery 35. If it is determined in step S604 that the battery 35 is unloaded, the startup method determination information storage processing program 204 stores on the internal memory of the embedded controller 33 the battery loading information indicating that the battery 35 is unloaded. If it is determined in step S604 that the battery 35 is not unloaded, the startup method determination information storage processing program 204 stores on the internal memory of the embedded controller 33 the battery loading information indicating that the battery 35 is not unloaded.

In step S504, the host CPU 11 for executing the application program 62 performs an end process of the application program 62. In step S504, for example, the application program 62 performs the end process by closing the file storing photographed image data.

In step S505, the host CPU 11 for executing the application program 62 notifies the real-time processing CPU 12 of the completion of the end process.

In step S701, the real-time processing CPU 12 for executing the operating system 141 receives the completion notification of the end process from the host CPU 11 via the bus.

In step S702, the real-time processing CPU 12 for executing the operating system 141 and application program 142 performs the end process. In step S703, the real-time processing CPU 12 for executing the operating system 141 notifies the host CPU 11 of the completion of the end process via the bus.

In step S702, for example, the real-time processing program 171 of the application program 142 returns a lens forming the optical system (not shown) to an end position thereof.

In step S506, the host CPU 11 for executing the application program 62 receives the completion notification of the end process from the real-time processing CPU 12 via the bus.

Upon completion of the end process, the real-time processing CPU 12 for executing the operating system 141 notifies the host CPU 11 of the completion of the end process via the bus in step S704. In step S507, the host CPU 11 for executing the operating system 61 receives the completion notification of the end process from the real-time processing CPU 12 via the bus.

After transmitting to the host CPU 11 the completion notification of the end process, the real-time processing CPU 12 is reset by the host CPU 11 having received the completion notification of the end process. The real-time processing CPU 12 then remains rest or executes an infinite loop command.

In step S508, the host CPU 11 for executing the set value storage processing program 77 of the operating system 61 causes the NAND-type flash memory 17 to store set values to be used to return to the startup process. The set values to be stored on the NAND-type flash memory 17 contains the shutter speed, exposure, the size of the image zoomed or photographed, the compression rate in the encoding process, and set values such as register values in the host CPU 11. The set values stored on the NAND-type flash memory 17 in step S508 includes values at registers in the real-time processing CPU 12 and values at registers in interfaces in the real-time processing CPU 12, the values being managed on the SDRAM 29 as variables of the operating system 141 and application program 142.

In step S509, the host CPU 11 for executing the operating system 61 performs an end process of the device driver 72. More specifically, the operating system 61 performs the end process of the device driver 72 by ending a process for controlling devices including the serial interface 19, the graphic controller 21, the memory card interface 23, the controller 25, the IDE interface 28 and the general-purpose input-output unit 32.

In part of the end process of the device driver 72 performed in step S510, the host CPU 11 for executing the other CPU program reading program 76 of the operating system 61 loads the operating system 141 and application program 142 of the real-time processing CPU 12 from the NAND-type flash memory 17 to the SDRAM 29.

That arrangement frees the host CPU 11 from loading the operating system 141 and application program 142 from the NAND-type flash memory 17 to the SDRAM 29 when the next warm boot startup process is to be performed. An even quicker startup is performed.

While the real-time processing CPU 12 is performing the end process, the operating system 141 and application program 142 are executed with internal variables thereof modified. The loading of the operating system 141 and application program 142 from the NAND-type flash memory 17 to the SDRAM 29 is preformed subsequent to the end process of the real-time processing CPU 12.

The real-time processing CPU 12 may be reset by the host CPU 11 before the host CPU 11 loads the operating system 141 and application program 142 from the NAND-type flash memory 17 to the NAND-type flash memory 17, and the real-time processing CPU 12 may be left in the reset state. Such an operation can load the operating system 141 and application program 142 from the NAND-type flash memory 17 to the NAND-type flash memory 17 and perform the startup process more safely than when the real-time processing CPU 12 executes an infinite loop command. More specifically, such an operation reduces the possibility that the operating system 141 and application program 142 loaded on the SDRAM 29 is modified by the real-time processing CPU 12 prior to a next startup.

If the real-time processing CPU 12 executes an infinite loop command rather than being transitioned to the reset state, the infinite loop command is stored on a storage region other than the storage area storing the operating system 141 and application program 142. For example, the real-time processing CPU 12 executes either the infinite loop command stored on the storage region other than the storage area storing the operating system141 and application program 142 or the infinite loop command stored on the mask ROM 13.

After completing the end process, the real-time processing CPU 12 remains in the reset state or executes the infinite loop command. This prevents the operating system 141 and application program 142 loaded on the SDRAM 29 from being modified until the digital still camera is started up next in the hot boot method.

If the pause state is determined to be the hibernation state S4 in step S502, step S510 may be skipped.

Subsequent to the completion of the end process of the device driver 72, the host CPU 11 for executing the operating system 61 performs an end process of the kernel 71 in step S511. In step S511, for example, the operating system 61 completes a predetermined process, such as monitoring the application program 62, managing resources such as the SDRAM 29, and performing inter-process communications.

Upon completing the end process of the kernel 71, the host CPU 11 for executing the operating system 61 performs an end process of the power supply management mechanism 73, such as setting a parameter in the pause state in step S512.

In step S513, the host CPU 11 for executing the power supply management mechanism 73 of the operating system 61 transmits a request to stop supplying power to the embedded controller 33 via the serial interface 19.

In step S605, the embedded controller 33 for executing the power supply control program 201 receives the request to stop supplying power from the host CPU 11 via the serial interface 19.

In step S606, the embedded controller 33 for executing the power supply control program 201 causes the DC-DC converter 34 to stop supplying power and ends the process. For example, the power supply control program 201 transitions the digital still camera to the suspension state S3 in step S606 by referencing the pause state information stored on the internal memory of the embedded controller 33. The power supply control program 201 thus causes the DC-DC converter 34 to stop supplying power to the host CPU 11 and the real-time processing CPU 12 while continuously supplying power to the SDRAM 29. To transition to the hibernation state S4, the power supply control program 201 causes the DC-DC converter 34 to stop supplying power to the SDRAM 29, the host CPU 11 and the real-time processing CPU 12.

The pause state is determined and the pause state information indicating the determined pause state is stored on the internal memory of the embedded controller 33. The digital still camera is then set to the determined pause state. Prior to the transition to the pause state, the set values required to return to the startup state are stored on the NAND-type flash memory 17.

Furthermore, the operating system 141 and application program 142 of the real-time processing CPU 12 are loaded to the SDRAM 29 prior to the transition to the suspension state S3.

The operating system 141 and application program 142 of the real-time processing CPU 12 may be to be loaded to the SDRAM 29 prior to the transition to the suspension state S3. In step S332 previously discussed, the real-time processing CPU 12 reads, from the SDRAM 29, values at registers in the real-time processing CPU 12 and values at registers in interfaces in the real-time processing CPU 12, the values being prior to the pause contained in the set values loaded onto the SDRAM 29 in step S241. The real-time processing CPU 12 sets the read values for the registers in the real-time processing CPU 12 and the registers in the interfaces of the real-time processing CPU 12.

The operating system 141 runs, starting with the correct values set for the registers in the real-time processing CPU 12 and the registers in the interfaces of the real-time processing CPU 12. The real-time processing CPU 12 is thus free from running away and the operating system 141 and application program 142 loaded on the SDRAM 29 prior to the transition to the suspension state S3 are prevented from being destroyed. The operating system 141 and application program 142 are thus correctly and reliably executed.

Figure 24:
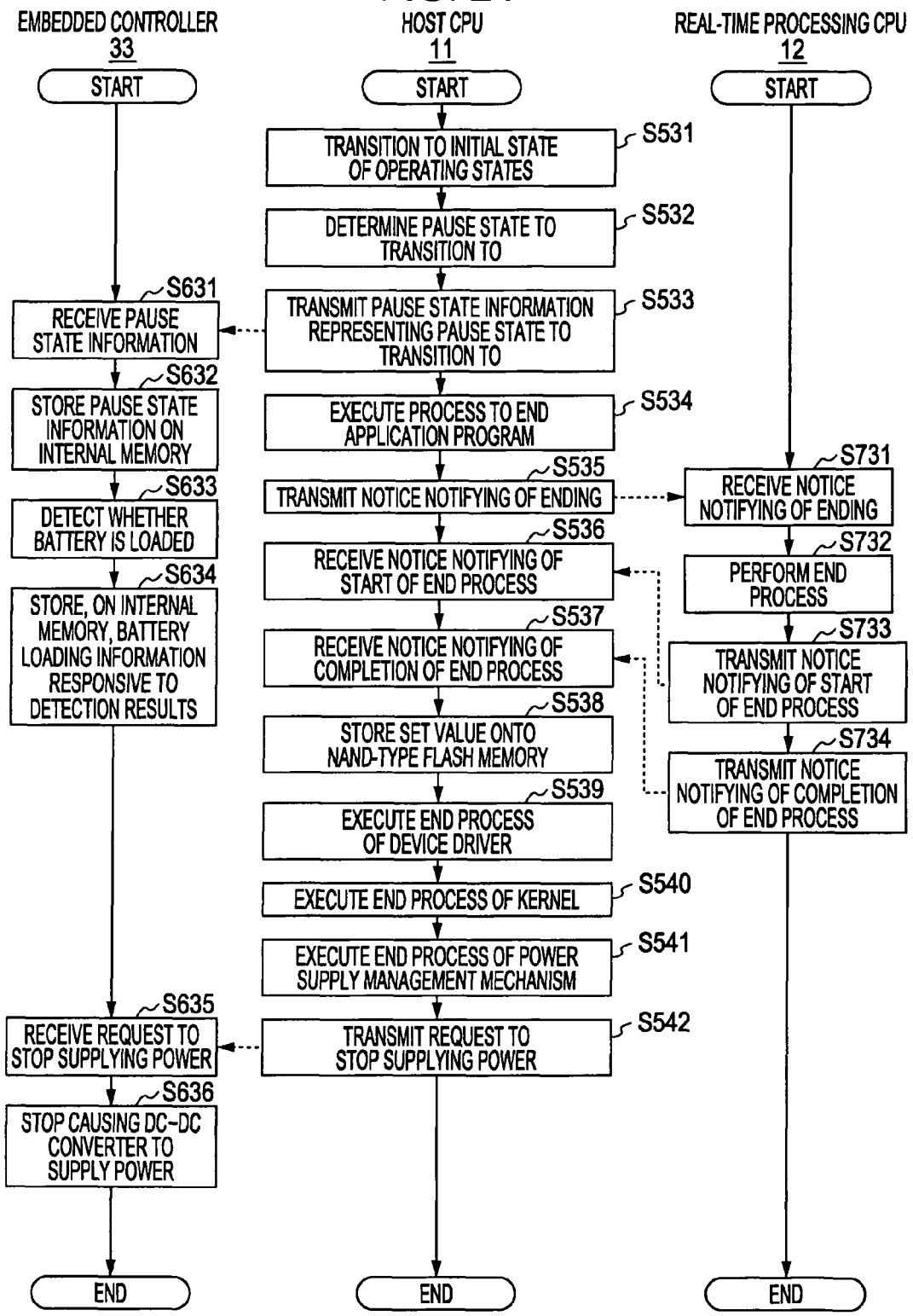
FIG. 24 is a flowchart illustrating another example of the pause process.

FIG. 24 is a flowchart illustrating another example of the pause process.

Figure 23:
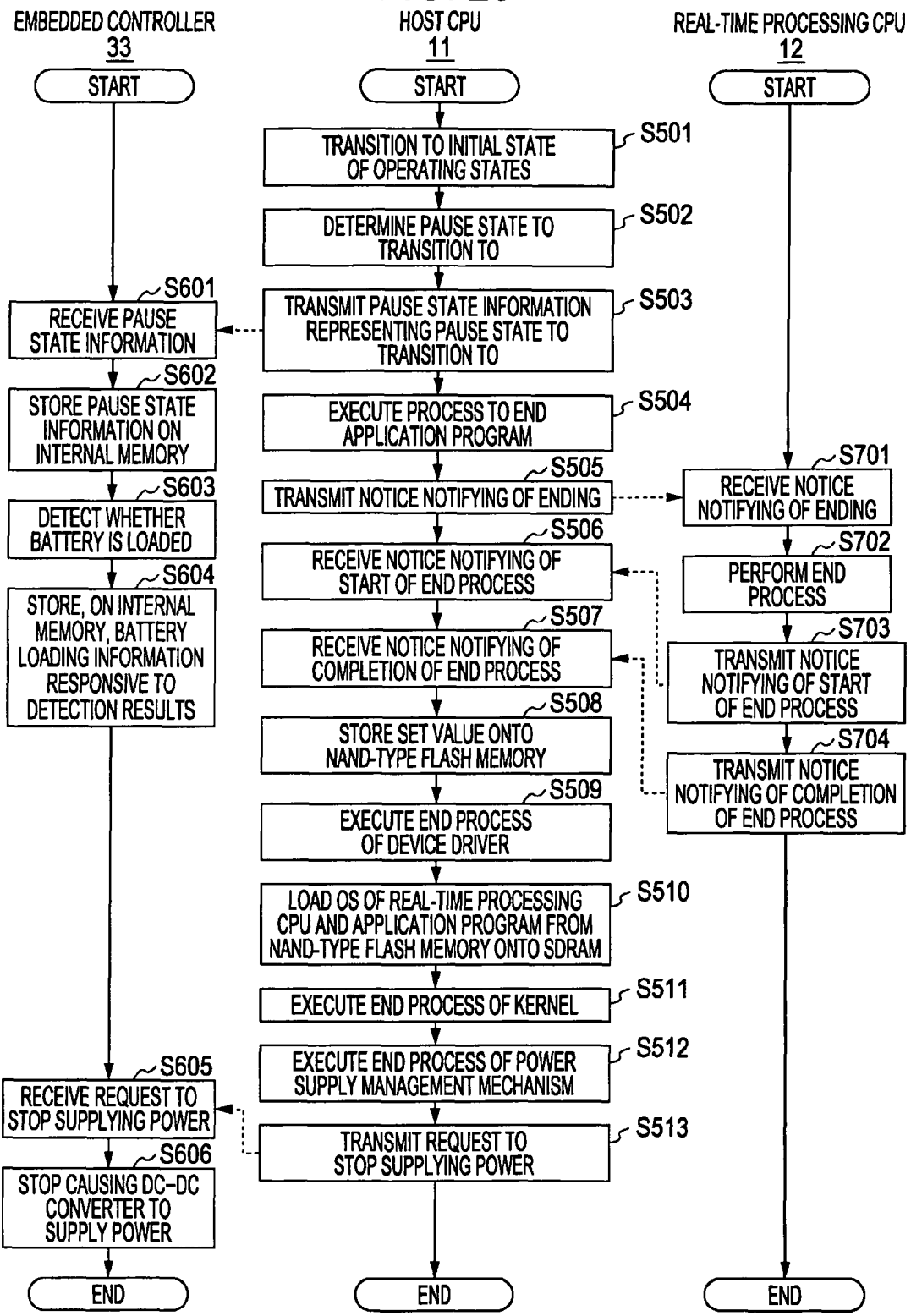
FIG. 23 is a flowchart illustrating one example of pause process.

Steps S531 through S539, steps S631 through S634, and steps S731 through S734 are respectively identical to steps S501 through S509, steps S601 through S604 and steps S701 through S704 of FIG. 23, and the discussion thereof is omitted here.

The operating system 141 and application program 142 of the real-time processing CPU 12 are not loaded onto the SDRAM 29 in the end process of the device driver 72 in the pause process illustrated in the flowchart of FIG. 24.

Steps S540 through S542 and steps S635 and S636 are respectively identical to steps S511 through S513 and steps S605 and S606 of FIG. 23, and the discussion thereof is omitted here.

The operating system 141 and application program 142 of the real-time processing CPU 12 may not be loaded onto the SDRAM 29 in the end process of the device driver 72.

The loading of the operating system 141 and application program 142 to the SDRAM 29 takes a predetermined period of time. If the operating system 141 and application program 142 are not loaded to the SDRAM 29, the pause process can be performed within a shorter period of time.

The set values stored on the NAND-type flash memory 17 do not contain the values at the registers in the real-time processing CPU 12 and the values at the registers in the interfaces in the real-time processing CPU 12 stored on the SDRAM 29 in step S538 as the variables of the operating system 141 and application program 142.

The memory area of the NAND-type flash memory 17 required to store the set values is thus reduced.

The hot boot startup process discussed with reference the flowcharts of FIGS. 17 through 19 may be performed subsequent to the pause process discussed with reference to the flowchart of FIG. 24. In such a case, prior to steps S242, the host CPU 11 for executing the other CPU program reading program 124 of the secondary boot loader 101 loads the operating system 141 and application program 142 of the real-time processing CPU 12 from the NAND-type flash memory 17 to the SDRAM 29.

A storage process of storing history of an unloading operation of the battery 35 is described below. The storage process is performed by the embedded controller 33 at every predetermined intervals. The embedded controller 33 is powered from the DC-DC converter 34 in the pause state and powered from the battery 36 in the mechanical-off state G3.

Figure 25:
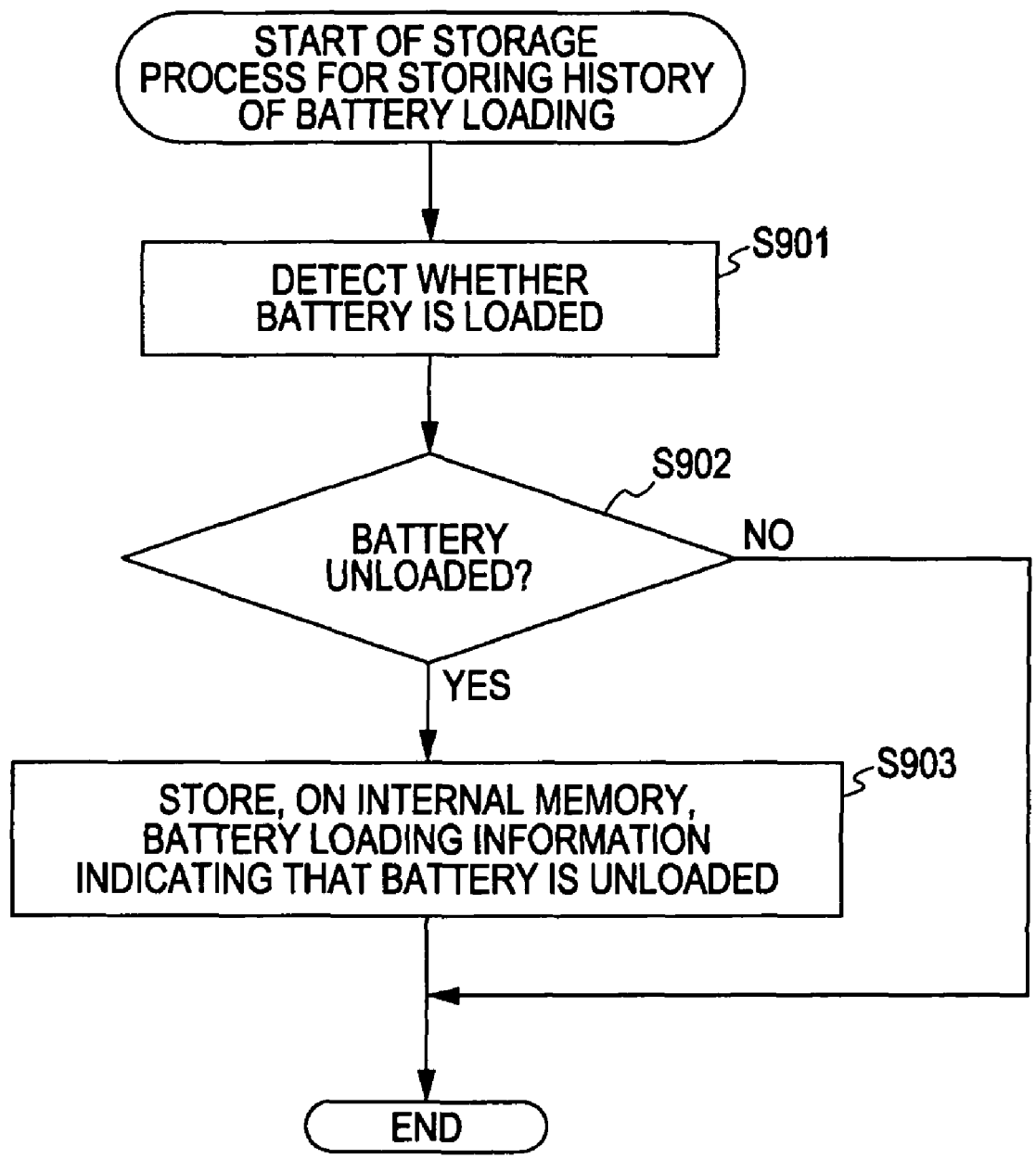
FIG. 25 is a flowchart illustrating a storage process of a history of unloading of a battery.

FIG. 25 is a flowchart illustrating the storage process of the history of unloading of the battery 35. In step S901, the embedded controller 33 for executing the battery loading detection program 206 detects the output voltage of the DC-DC converter 34, thereby detecting the loading of the battery 35. For example, in step S901, the battery loading detection program 206 compares the output voltage of the DC-DC converter 34 with a predetermined threshold value, thereby determining whether the battery 35 is loaded or unloaded.

In step S902, the embedded controller 33 for executing the startup method determination information storage processing program 204 determines whether the battery 35 is unloaded. If it is determined in step S902 that the battery 35 is unloaded, processing proceeds to step S903. The embedded controller 33 for executing the startup method determination information storage processing program 204 stores the battery loading information on the internal memory thereof. Processing thus ends. If the battery 35 is unloaded, the battery loading information stored on the embedded controller 33 is updated to indicate that the battery 35 is unloaded.

If it is determined in step S902 that the battery 35 is not unloaded, it is not necessary to update the battery loading information stored on the embedded controller 33. Processing thus ends with step S903 skipped.

If the battery 35 is unloaded in the pause state, the battery loading information is updated to indicate that the battery 35 is unloaded. The battery loading information thus indicates the history of the loading of the battery 35 in the pause state.

In step S901, the embedded controller 33 for executing the battery loading detection program 206 may detect the stop of the supplying of power from an external power supply by detecting the output voltage of the DC-DC converter 34 and in step S902, the embedded controller 33 for executing the startup method determination information storage processing program 204 may determine whether the external power supply stops supplying power. If it is determined in step S902 that the external power supply stops supplying power, the embedded controller 33 for executing the startup method determination information storage processing program 204 may store onto the internal memory thereof the battery loading information indicating the stop of power supplying from the external power supply in step S903. The battery loading information then indicates a history of power supplying from the external power supply.

Furthermore, in step S901, the embedded controller 33 for executing the battery loading detection program 206 may detect the stop of power supplying from the external power supply and the loading of the battery 35 by detecting the output voltage of the DC-DC converter 34 and, in step S902, the embedded controller 33 for executing the startup method determination information storage processing program 204 may determine whether the external power supply stops supplying power and whether the battery 35 is unloaded. If it is determined in step S902 that the external power supply stops supplying power and that the battery 35 is unloaded, the embedded controller 33 for executing the startup method determination information storage processing program 204 may store on the internal memory thereof the battery loading information indicating that the external power supply stops supplying power and that the battery 35 is unloaded.

The battery loading information is one example of information that indicates the history of stop of power supplying to maintain the suspension state S3 of the pause state. The battery loading detection program 206 detects the stop of power supplying to maintain the suspension state S3 of the pause state.

Figure 26:
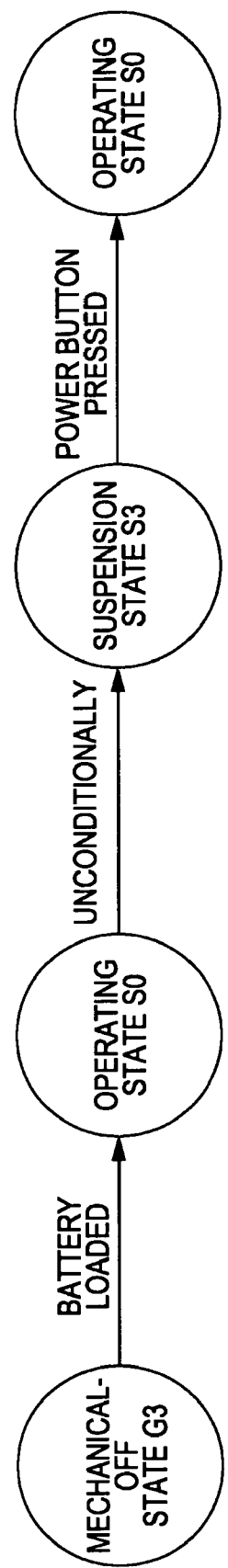
FIG. 26 illustrates state transitions at startup.

If the battery 35 is loaded in the mechanical-off state G3 as shown in FIG. 26, the digital still camera is started up in one of the cold boot and the warm, boot and transitioned to the operating state S0 in response to the start trigger caused by the loading of the battery 35. The digital still camera may be transitioned from the operating state S0 to the suspension state S3 unconditionally. In such a case, neither startup screen nor startup sound is output.

Even if one of the cold boot startup process and the warm boot startup process takes time, the digital still camera is set to pause in the suspension state S3 simply by loading the battery 35 before the user knows.

With the power button pressed in the suspension state S3, the digital still camera is started up to the operating state S0 in the hot boot startup method. In response to another trigger such as the opening of the lens cap, the digital still camera may be transitioned from the suspension state S3 to the operating state S0 in the hot boot startup method.

To the user, the digital still camera appears to start up quickly from the mechanical-off state G3 in response to a trigger such as the pressing of the power button.

The digital still camera transitions to the pause state or the operating state S0 in response to the user operation. In the transition from the pause state to the operating state S0, the digital still camera quickly starts up.

If the digital still camera is started up in the middle of the suspension state S3 without unloading the battery 35, the hot boot startup method is used. If the user unloads and then loads back the battery 35 in the suspension state S3, the digital still camera is started in the warm boot startup method. The digital still camera, once paused in the hibernation state S4, is started up in the warm boot startup method regardless of whether the battery 35 is loaded or not. It appears to the user that the pause state is a power-off state (mechanical-off state G3).

If transitioned to one of the suspension state and the hibernation state as the pause state, the digital still camera resumes operation from one of the suspension state and the hibernation state. If the digital still camera is transitioned from one of the suspension state and the hibernation state to the pause state, the storage of the pause state information indicating one of the suspension state and the hibernation state to the pause state the digital still camera is going to transition to is controlled. The stop of supplying power for maintaining the suspension state is detected. The startup method to the pause state to the operating state is determined based on the pause state information and the history information relating to the history of stop of supplying power in the pause state. The startup process is performed quickly even when the power supplying for maintaining the suspension state is stopped.

The pause state information and the history information are acquired. The pause state information indicates one of the suspension state and the hibernation state and stored in the case of transition thereto, and the history information indicates a history of a stop of supplying power in the pause state accounting for a detection of the stop of supplying power to maintain the suspension state. The startup method to transition from the pause state to the operating state is determined based on the pause state information and the history information. The startup process is performed quickly even when the power supplying for maintaining the suspension state is stopped.

The present invention is applicable not only to the digital still camera but also to mobile apparatuses including a personal computer, a digital video camera, a cell phone, and a mobile player, and stationary apparatuses including a HDD recorder and player and a television receiver.

The digital still camera is transitioned to the initial state SON if started in one of the warm boot and the cold boot. Even when the digital still camera is transitioned to the initial state SON as a result of one of the warm boot and the cold boot, the digital still camera may be transition to a process responsive to the trigger type of the initial state SON.

The above-described series of process steps may be performed using hardware or software. If the above-described series of process steps are performed using software, a program forming the software may be installed from a program recording medium to a computer contained in dedicated hardware or a general-purpose computer that can perform a variety of processes with a variety programs installed thereon.

The program to be executed by the computer (such as the host CPU 11, the real-time processing CPU 12 or the embedded controller 33) may be recorded on a removable medium and then supplied as a package medium including the removable medium. The package media may include magnetic disks (including a flexible disk), optical disks (including compact-disk read-only memory (CD-ROM), and digital versatile disk (DVD)), a magneto-optical disk, and a semiconductor memory.

The program may also be supplied via wired or wireless communication media including a local area network (LAN), the Internet, and digital satellite broadcasting systems.

The removable medium is loaded on a drive connected to the IDE interface 28 and the program is then stored onto the NAND-type flash memory 17 via the IDE interface 28. The program is thus installed. The program is received via a wireless communication medium and the wireless LAN interface 24 or via a wired communication medium and the general-purpose input-output unit 32, and then stored onto the NAND-type flash memory 17. The program is thus installed. Alternatively, the program may be pre-stored on the NAND-type flash memory 17.

The program may be performed in the time-series order previously discussed or may be performed at proper timing when each call is made.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing apparatus pausing in one of pause states including a suspension state and a hibernation state, comprising:
   storage control means for controlling storage of pause state information regarding one of the suspension state and the hibernation state in the case of transition thereto, the pause state information indicating transition to the hibernation state when the apparatus is transitioned from the suspension state to the hibernation state;
   detecting means for detecting a stop of supplying power to maintain the suspension state as the pause state; and
   startup method determination means for determining a startup method to transition from the pause state to an operating state based on the pause state information and history information indicating a history of supplying power in the pause state accounting for the detection results about the stop of supplying power.

2. The information processing apparatus according to claim 1, wherein the startup method determination means determines the startup method to transition from the pause state to the operating state between a first startup method and a second startup method, wherein the first startup method is initiated by executing a program stored on a volatile memory in the suspension state, the program once stored on the volatile memory in the operating state immediately prior to transitioning to the pause state, and wherein the second startup method is initiated by loading an image stored on a non-volatile memory to the volatile memory for execution, the image corresponding to the program once stored on the volatile memory in the operating state immediately prior to transitioning to the pause state.

3. The information processing apparatus according to claim 2, wherein the startup method determination means determines the first startup method as the startup method to transition from the pause state to the operating state if the pause state information indicates the suspension state and if the history information indicates the power supplying has not been stopped in the suspension state.

4. The information processing apparatus according to claim 2, wherein the startup method determination means determines the second startup method as the startup method to transition from the pause state to the operating state if the pause state information indicates the suspension state and if the history information indicates the power supplying has been stopped in the suspension state.

5. The information processing apparatus according to claim 2, wherein the startup method determination means determines the second startup method as the startup method to transition from the pause state to the operating state if the pause state information indicates the hibernation state.

6. The information processing apparatus according to claim 1, further comprising pause state determination means for determining whether to transition to the suspension state or the hibernation state.

7. The information processing apparatus according to claim 1, wherein if a battery supplying power to maintain the suspension state is once unloaded and then reloaded, the operating state is activated in response to the loading of the battery and then unconditionally transitioned to the suspension state.

8. The information processing apparatus according to claim 1, wherein the detecting means detects the stop of supplying power in response to the unloading of the battery supplying power for maintaining the suspension state.

9. The information processing apparatus according to claim 1, wherein the detecting means detects the stop of supplying power fed from an external power supply for maintaining the suspension state.

10. An information processing method of an information processing apparatus pausing in one of pause states including a suspension state and a hibernation state, comprising:
    controlling storage of pause state information regarding one of the suspension state and the hibernation state in the case of transition thereto, the pause state information indicating transition to the hibernation state when the apparatus is transitioned from the suspension state to the hibernation state;
    detecting a stop of supplying power to maintain the suspension state as the pause state; and
    determining a startup method to transition from the pause state to an operating state based on the pause state information and history information indicating a history of supplying power in the pause state accounting for the detection results about the stop of supplying power.

11. A non-transitory computer readable recording medium on which is recorded a computer program for causing a computer to perform an information processing method of an information processing apparatus pausing in one of pause states including a suspension state and a hibernation state, comprising:
    acquiring pause state information and history information, the pause state information indicating one of the suspension state and the hibernation state and stored in the case of transition thereto, the pause state information indicating transition to the hibernation state when the apparatus is transitioned from the suspension state to the hibernation state, and the history information indicating a history of a stop of supplying power in the pause state accounting for a detection of the stop of supplying power for maintaining the suspension state; and
    determining a startup method to transition from the pause state to an operating state based on the pause state information and the history information.

12. An information processing apparatus pausing in one of pause states including a suspension state and a hibernation state, comprising:
    a storage control unit controlling storage of pause state information regarding one of the suspension state and the hibernation state in the case of transition thereto, the pause state information indicating transition to the hibernation state when the apparatus is transitioned from the suspension state to the hibernation state;
    a detecting unit detecting a stop of supplying power to maintain the suspension state as the pause state; and a startup method determination unit determining a startup method to transition from the pause state to an operating state based on the pause state information and history information indicating a history of supplying power in the pause state accounting for the detection results about the stop of supplying power.

* * * * *